US011354123B2

(12) United States Patent
Chang et al.

(10) Patent No.: US 11,354,123 B2
(45) Date of Patent: Jun. 7, 2022

(54) MEMORY DEVICE AND COMPUTING IN MEMORY METHOD THEREOF

(71) Applicant: MACRONIX INTERNATIONAL CO., LTD., Hsinchu (TW)

(72) Inventors: Hung-Sheng Chang, Taipei (TW); Han-Wen Hu, Tainan (TW); Yueh-Han Wu, New Taipei (TW); Tse-Yuan Wang, Kinmen County (TW); Yuan-Hao Chang, Taipei (TW); Tei-Wei Kuo, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 156 days.

(21) Appl. No.: 17/026,347

(22) Filed: Sep. 21, 2020

(65) Prior Publication Data

US 2021/0117187 A1    Apr. 22, 2021

Related U.S. Application Data

(60) Provisional application No. 62/916,797, filed on Oct. 18, 2019.

(51) Int. Cl.
*G06F 7/544* (2006.01)
*G06F 9/345* (2018.01)
*G06F 9/30* (2018.01)

(52) U.S. Cl.
CPC .......... *G06F 9/3001* (2013.01); *G06F 7/5443* (2013.01); *G06F 9/3455* (2013.01)

(58) Field of Classification Search
CPC .... G06F 9/3001; G06F 7/5443; G06F 9/3455; G06F 15/7821; G06F 17/153; G06N 3/0454; G06N 3/063
See application file for complete search history.

(56) References Cited

U.S. PATENT DOCUMENTS 9,721,203 B1 *  8/2017  Young ................. G06N 3/0454
9,766,886 B2    9/2017  Corbal et al.
(Continued)

FOREIGN PATENT DOCUMENTS

TW       I550628 B     9/2016
TW    201911057 A      3/2019
(Continued)

OTHER PUBLICATIONS

Ma, Y et al. Optimizing the Convolution Operation to Accelerate Deep Neural Networks on FPGA. IEEE Transactions on VLSI Systems, vol. 26, No. 7, pp. 1354-1367, Jul. 2018, [online], [retrieved on Mar. 29, 2022], <URL: https://ieeexplore.ieee.org/document/8330049> <DOI: 10.1109/TVLSI.2018.2815603>.*

(Continued)

*Primary Examiner* — Shawn Doman
(74) *Attorney, Agent, or Firm* — McClure, Qualey & Rodack, LLP

(57) ABSTRACT

A computing in memory method for a memory device is provided. The computing in memory method includes: based on a stride parameter, unfolding a kernel into a plurality of sub-kernels and a plurality of complement sub-kernels; based on the sub-kernels and the complement sub-kernels, writing a plurality of weights into a plurality of target memory cells of a memory array of the memory device; inputting an input data into a selected word line of the memory array; performing a stride operation in the memory array; temporarily storing a plurality of partial sums; and summing the stored partial sums into a stride operation result when all operation cycles are completed.

10 Claims, 23 Drawing Sheets

(56) References Cited

U.S. PATENT DOCUMENTS

| | | | |
|---|---|---|---|
| 10,193,569 B2 | 1/2019 | Tseng et al. | |
| 10,255,656 B2 | 4/2019 | Appu et al. | |
| 10,388,387 B2 | 8/2019 | Park | |
| 10,445,002 B2 | 10/2019 | Lin et al. | |
| 10,719,296 B2 | 7/2020 | Lee et al. | |
| 2016/0342893 A1* | 11/2016 | Ross | G06F 17/153 |
| 2018/0096226 A1 | 4/2018 | Aliabadi et al. | |
| 2019/0294413 A1 | 9/2019 | Vantrease et al. | |
| 2020/0272946 A1* | 8/2020 | Kim | G06N 3/0454 |
| 2021/0173787 A1* | 6/2021 | Nagy | G06N 3/063 |

FOREIGN PATENT DOCUMENTS

| | | |
|---|---|---|
| TW | 201926023 A | 7/2019 |
| TW | 201933190 A | 8/2019 |
| TW | 201941159 A | 10/2019 |

OTHER PUBLICATIONS

Chen, Yh et al. Eyeriss: An Energy-Efficient Reconfigurable Accelerator for Deep Convolutional Neural Networks. IEEE Journal of Solid-State Circuits, vol. 52, No. 1, pp. 127-138, Jan. 2017, [online], [retrieved on Mar. 29, 2022], <URL: https://ieeexplore.ieee.org/document/7738524> <DOI: 10.1109/JSSC.2016.2616357>.*

Tu, F et al. Deep Convolutional Neural Network Architecture With Reconfigurable Computation Patterns, IEEE Transactions on VLSI Systems, vol. 25, No. 8, pp. 2220-2233, Aug. 2017, [online], [retrieved on Mar. 29, 2022], <URL: https://ieeexplore.ieee.org/document/7898402> <DOI: 10.1109/TVLSI.2017.2688340>.*

* cited by examiner

| | | BL1 |
|---|---|---|
| | WL1 | W1 |
| | WL2 | W2 |
| | WL3 | W3 |
| | WL4 | W4 |
| | WL5 | W5 |
| | WL6 | W6 |
| | WL7 | W7 |
| | WL8 | W8 |
| | WL9 | W9 |

FIG. 3 first cycle

|      |     | BL1 |
|------|-----|-----|
| IN1  | WL1 | W1  |
| IN2  | WL2 | W2  |
| IN3  | WL3 | W3  |
| IN6  | WL4 | W4  |
| IN7  | WL5 | W5  |
| IN8  | WL6 | W6  |
| IN11 | WL7 | W7  |
| IN12 | WL8 | W8  |
| IN13 | WL9 | W9  | second cycle

|      |     | BL1 |
|------|-----|-----|
| IN6  | WL1 | W1  |
| IN7  | WL2 | W2  |
| IN8  | WL3 | W3  |
| IN11 | WL4 | W4  |
| IN12 | WL5 | W5  |
| IN13 | WL6 | W6  |
| IN16 | WL7 | W7  |
| IN17 | WL8 | W8  |
| IN18 | WL9 | W9  | third cycle

|      |     | BL1 |
|------|-----|-----|
| IN11 | WL1 | W1  |
| IN12 | WL2 | W2  |
| IN13 | WL3 | W3  |
| IN16 | WL4 | W4  |
| IN17 | WL5 | W5  |
| IN18 | WL6 | W6  |
| IN21 | WL7 | W7  |
| IN22 | WL8 | W8  |
| IN23 | WL9 | W9  | fourth cycle

|      |     | BL1 |
|------|-----|-----|
| IN2  | WL1 | W1  |
| IN3  | WL2 | W2  |
| IN4  | WL3 | W3  |
| IN7  | WL4 | W4  |
| IN8  | WL5 | W5  |
| IN9  | WL6 | W6  |
| IN12 | WL7 | W7  |
| IN13 | WL8 | W8  |
| IN14 | WL9 | W9  | fifth cycle

|      |     | BL1 |
|------|-----|-----|
| IN7  | WL1 | W1  |
| IN8  | WL2 | W2  |
| IN9  | WL3 | W3  |
| IN12 | WL4 | W4  |
| IN13 | WL5 | W5  |
| IN14 | WL6 | W6  |
| IN17 | WL7 | W7  |
| IN18 | WL8 | W8  |
| IN19 | WL9 | W9  | sixth cycle

|      |     | BL1 |
|------|-----|-----|
| IN12 | WL1 | W1  |
| IN13 | WL2 | W2  |
| IN14 | WL3 | W3  |
| IN17 | WL4 | W4  |
| IN18 | WL5 | W5  |
| IN19 | WL6 | W6  |
| IN22 | WL7 | W7  |
| IN23 | WL8 | W8  |
| IN24 | WL9 | W9  | seventh cycle

|      |     | BL1 |
|------|-----|-----|
| IN3  | WL1 | W1  |
| IN4  | WL2 | W2  |
| IN5  | WL3 | W3  |
| IN8  | WL4 | W4  |
| IN9  | WL5 | W5  |
| IN10 | WL6 | W6  |
| IN13 | WL7 | W7  |
| IN14 | WL8 | W8  |
| IN15 | WL9 | W9  | eighth cycle

|      |     | BL1 |
|------|-----|-----|
| IN8  | WL1 | W1  |
| IN9  | WL2 | W2  |
| IN10 | WL3 | W3  |
| IN13 | WL4 | W4  |
| IN14 | WL5 | W5  |
| IN15 | WL6 | W6  |
| IN18 | WL7 | W7  |
| IN19 | WL8 | W8  |
| IN20 | WL9 | W9  | ninth cycle

|      |     | BL1 |
|------|-----|-----|
| IN13 | WL1 | W1  |
| IN14 | WL2 | W2  |
| IN15 | WL3 | W3  |
| IN18 | WL4 | W4  |
| IN19 | WL5 | W5  |
| IN20 | WL6 | W6  |
| IN23 | WL7 | W7  |
| IN24 | WL8 | W8  |
| IN25 | WL9 | W9  |

| FIG. 8A | FIG. 8B | | | | | | | | | 800 |
|---|---|---|---|---|---|---|---|---|---|---|

|  |  | BL1 | BL2 | BL3 | BL4 | BL5 | BL6 | BL7 | BL8 |
|---|---|---|---|---|---|---|---|---|---|
|  | WL1 | W1 | ○ | ○ | ○ | ○ | ○ | ○ | ○ |
|  | WL2 | W2 | ○ | ○ | ○ | W1 | ○ | ○ | ○ |
|  | WL3 | W3 | ○ | ○ | ○ | W2 | ○ | ○ | ○ |
|  | WL4 | W4 | W1 | ○ | ○ | ○ | ○ | ○ | ○ |
|  | WL5 | W5 | W2 | ○ | ○ | W4 | W1 | ○ | ○ |
|  | WL6 | W6 | W3 | ○ | ○ | W5 | W2 | ○ | ○ |
|  | WL7 | W7 | W4 | W1 | ○ | ○ | ○ | ○ | ○ |
|  | WL8 | W8 | W5 | W2 | ○ | W7 | W4 | W1 | ○ |
|  | WL9 | W9 | W6 | W3 | ○ | W8 | W5 | W2 | ○ |
|  | WL10 | ○ | W7 | W4 | W1 | ○ | ○ | ○ | ○ |
|  | WL11 | ○ | W8 | W5 | W2 | ○ | W7 | W4 | W1 |
|  | WL12 | ○ | W9 | W6 | W3 | ○ | W8 | W5 | W2 |
|  | WL13 | ○ | ○ | W7 | W4 | ○ | ○ | ○ | ○ |
|  | WL14 | ○ | ○ | W8 | W5 | ○ | ○ | W7 | W4 |
|  | WL15 | ○ | ○ | W9 | W6 | ○ | ○ | W8 | W5 |
|  | WL16 | ○ | ○ | ○ | W7 | ○ | ○ | ○ | ○ |
|  | WL17 | ○ | ○ | ○ | W8 | ○ | ○ | ○ | W7 |
|  | WL18 | ○ | ○ | ○ | W9 | ○ | ○ | ○ | W8 |
|  | WL19 | ○ | ○ | ○ | ○ | W3 | ○ | ○ | ○ |
|  | WL20 | ○ | ○ | ○ | ○ | ○ | ○ | ○ | ○ |
|  | WL21 | ○ | ○ | ○ | ○ | ○ | ○ | ○ | ○ |
|  | WL22 | ○ | ○ | ○ | ○ | W6 | W3 | ○ | ○ |
|  | WL23 | ○ | ○ | ○ | ○ | ○ | ○ | ○ | ○ |
|  | WL24 | ○ | ○ | ○ | ○ | ○ | ○ | ○ | ○ |
|  | WL25 | ○ | ○ | ○ | ○ | W9 | W6 | W3 | ○ |
|  | WL26 | ○ | ○ | ○ | ○ | ○ | ○ | ○ | ○ |
|  | WL27 | ○ | ○ | ○ | ○ | ○ | ○ | ○ | ○ |
|  | WL28 | ○ | ○ | ○ | ○ | ○ | W9 | W6 | W3 |
|  | WL29 | ○ | ○ | ○ | ○ | ○ | ○ | ○ | ○ |
|  | WL30 | ○ | ○ | ○ | ○ | ○ | ○ | ○ | ○ |
|  | WL31 | ○ | ○ | ○ | ○ | ○ | ○ | W9 | W6 |
|  | WL32 | ○ | ○ | ○ | ○ | ○ | ○ | ○ | ○ |
|  | WL33 | ○ | ○ | ○ | ○ | ○ | ○ | ○ | ○ |
|  | WL34 | ○ | ○ | ○ | ○ | ○ | ○ | ○ | W9 |
|  | WL35 | ○ | ○ | ○ | ○ | ○ | ○ | ○ | ○ |
|  | WL36 | ○ | ○ | ○ | ○ | ○ | ○ | ○ | ○ |
|  |  | L1 | L2 | L3 | L4 | L5 | L6 | L7 | L8 |

FIG. 8A

| FIG. 8A | FIG. 8B |

800

|      | BL9 | BL10 | BL11 | BL12 | BL13 | BL14 | BL15 | BL16 |
|------|-----|------|------|------|------|------|------|------|
| WL1  | ○   | ○    | ○    | ○    | ○    | ○    | ○    | ○    |
| WL2  | ○   | ○    | ○    | ○    | ○    | ○    | ○    | ○    |
| WL3  | W1  | ○    | ○    | ○    | ○    | ○    | ○    | ○    |
| WL4  | ○   | ○    | ○    | ○    | ○    | ○    | ○    | ○    |
| WL5  | ○   | ○    | ○    | ○    | ○    | ○    | ○    | ○    |
| WL6  | W4  | W1   | ○    | ○    | ○    | ○    | ○    | ○    |
| WL7  | ○   | ○    | ○    | ○    | ○    | ○    | ○    | ○    |
| WL8  | ○   | ○    | ○    | ○    | ○    | ○    | ○    | ○    |
| WL9  | W7  | W4   | W1   | ○    | ○    | ○    | ○    | ○    |
| WL10 | ○   | ○    | ○    | ○    | ○    | ○    | ○    | ○    |
| WL11 | ○   | ○    | ○    | ○    | ○    | ○    | ○    | ○    |
| WL12 | ○   | W7   | W4   | W1   | ○    | ○    | ○    | ○    |
| WL13 | ○   | ○    | ○    | ○    | ○    | ○    | ○    | ○    |
| WL14 | ○   | ○    | ○    | ○    | ○    | ○    | ○    | ○    |
| WL15 | ○   | ○    | W7   | W4   | ○    | ○    | ○    | ○    |
| WL16 | ○   | ○    | ○    | ○    | ○    | ○    | ○    | ○    |
| WL17 | ○   | ○    | ○    | ○    | ○    | ○    | ○    | ○    |
| WL18 | ○   | ○    | ○    | W7   | ○    | ○    | ○    | ○    |
| WL19 | W2  | ○    | ○    | ○    | W1   | ○    | ○    | ○    |
| WL20 | W3  | ○    | ○    | ○    | W2   | ○    | ○    | ○    |
| WL21 | ○   | ○    | ○    | ○    | W3   | ○    | ○    | ○    |
| WL22 | W5  | W2   | ○    | ○    | W4   | W1   | ○    | ○    |
| WL23 | W6  | W3   | ○    | ○    | W5   | W2   | ○    | ○    |
| WL24 | ○   | ○    | ○    | ○    | W6   | W3   | ○    | ○    |
| WL25 | W8  | W5   | W2   | ○    | W7   | W4   | W1   | ○    |
| WL26 | W9  | W6   | W3   | ○    | W8   | W5   | W2   | ○    |
| WL27 | ○   | ○    | ○    | ○    | W9   | W6   | W3   | ○    |
| WL28 | ○   | W8   | W5   | W2   | ○    | W7   | W4   | W1   |
| WL29 | ○   | W9   | W6   | W3   | ○    | W8   | W5   | W2   |
| WL30 | ○   | ○    | ○    | ○    | ○    | W9   | W6   | W3   |
| WL31 | ○   | ○    | W8   | W5   | ○    | ○    | W7   | W4   |
| WL32 | ○   | ○    | W9   | W6   | ○    | ○    | W8   | W5   |
| WL33 | ○   | ○    | ○    | ○    | ○    | ○    | W9   | W6   |
| WL34 | ○   | ○    | ○    | W8   | ○    | ○    | ○    | W7   |
| WL35 | ○   | ○    | ○    | W9   | ○    | ○    | ○    | W8   |
| WL36 | ○   | ○    | ○    | ○    | ○    | ○    | ○    | W9   |
|      | L9  | L10  | L11  | L12  | L13  | L14  | L15  | L16  |

FIG. 8B first cycle  800

| | | BL1 | BL2 | BL3 | BL4 | BL5 | BL6 | BL7 | BL8 |
|---|---|---|---|---|---|---|---|---|---|
| IN1-1 | WL1 | W1 | ○ | ○ | ○ | ○ | ○ | ○ | ○ |
| IN1-2 | WL2 | W2 | ○ | ○ | ○ | W1 | ○ | ○ | ○ |
| IN1-3 | WL3 | W3 | ○ | ○ | ○ | W2 | ○ | ○ | ○ |
| IN1-4 | WL4 | W4 | W1 | ○ | ○ | ○ | ○ | ○ | ○ |
| IN1-5 | WL5 | W5 | W2 | ○ | ○ | W4 | W1 | ○ | ○ |
| IN1-6 | WL6 | W6 | W3 | ○ | ○ | W5 | W2 | ○ | ○ |
| IN1-7 | WL7 | W7 | W4 | W1 | ○ | ○ | ○ | ○ | ○ |
| IN1-8 | WL8 | W8 | W5 | W2 | ○ | W7 | W4 | W1 | ○ |
| IN1-9 | WL9 | W9 | W6 | W3 | ○ | W8 | W5 | W2 | ○ |
| | WL10 | ○ | W7 | W4 | W1 | ○ | ○ | ○ | ○ |
| | WL11 | ○ | W8 | W5 | W2 | ○ | W7 | W4 | W1 |
| | WL12 | ○ | W9 | W6 | W3 | ○ | W8 | W5 | W2 |
| | WL13 | ○ | ○ | W7 | W4 | ○ | ○ | ○ | ○ |
| | WL14 | ○ | ○ | W8 | W5 | ○ | ○ | W7 | W4 |
| | WL15 | ○ | ○ | W9 | W6 | ○ | ○ | W8 | W5 |
| | WL16 | ○ | ○ | ○ | W7 | ○ | ○ | ○ | ○ |
| | WL17 | ○ | ○ | ○ | W8 | ○ | ○ | ○ | W7 |
| | WL18 | ○ | ○ | ○ | W9 | ○ | ○ | ○ | W8 |
| | WL19 | ○ | ○ | ○ | ○ | W3 | ○ | ○ | ○ |
| | WL20 | ○ | ○ | ○ | ○ | ○ | ○ | ○ | ○ |
| | WL21 | ○ | ○ | ○ | ○ | ○ | ○ | ○ | ○ |
| | WL22 | ○ | ○ | ○ | ○ | W6 | W3 | ○ | ○ |
| | WL23 | ○ | ○ | ○ | ○ | ○ | ○ | ○ | ○ |
| | WL24 | ○ | ○ | ○ | ○ | ○ | ○ | ○ | ○ |
| | WL25 | ○ | ○ | ○ | ○ | W9 | W6 | W3 | ○ |
| | WL26 | ○ | ○ | ○ | ○ | ○ | ○ | ○ | ○ |
| | WL27 | ○ | ○ | ○ | ○ | ○ | ○ | ○ | ○ |
| | WL28 | ○ | ○ | ○ | ○ | ○ | W9 | W6 | W3 |
| | WL29 | ○ | ○ | ○ | ○ | ○ | ○ | ○ | ○ |
| | WL30 | ○ | ○ | ○ | ○ | ○ | ○ | ○ | ○ |
| | WL31 | ○ | ○ | ○ | ○ | ○ | ○ | W9 | W6 |
| | WL32 | ○ | ○ | ○ | ○ | ○ | ○ | ○ | ○ |
| | WL33 | ○ | ○ | ○ | ○ | ○ | ○ | ○ | ○ |
| | WL34 | ○ | ○ | ○ | ○ | ○ | ○ | ○ | W9 |
| | WL35 | ○ | ○ | ○ | ○ | ○ | ○ | ○ | ○ |
| | WL36 | ○ | ○ | ○ | ○ | ○ | ○ | ○ | ○ |
| | | L1 | L2 | L3 | L4 | L5 | L6 | L7 | L8 |

FIG. 9A first cycle 800

|  |  | BL9 | BL10 | BL11 | BL12 | BL13 | BL14 | BL15 | BL16 |
|---|---|---|---|---|---|---|---|---|---|
| IN1-1 | WL1 | ○ | ○ | ○ | ○ | ○ | ○ | ○ | ○ |
| IN1-2 | WL2 | ○ | ○ | ○ | ○ | ○ | ○ | ○ | ○ |
| IN1-3 | WL3 | W1 | ○ | ○ | ○ | ○ | ○ | ○ | ○ |
| IN1-4 | WL4 | ○ | ○ | ○ | ○ | ○ | ○ | ○ | ○ |
| IN1-5 | WL5 | ○ | ○ | ○ | ○ | ○ | ○ | ○ | ○ |
| IN1-6 | WL6 | W4 | W1 | ○ | ○ | ○ | ○ | ○ | ○ |
| IN1-7 | WL7 | ○ | ○ | ○ | ○ | ○ | ○ | ○ | ○ |
| IN1-8 | WL8 | ○ | ○ | ○ | ○ | ○ | ○ | ○ | ○ |
| IN1-9 | WL9 | W7 | W4 | W1 | ○ | ○ | ○ | ○ | ○ |
|  | WL10 | ○ | ○ | ○ | ○ | ○ | ○ | ○ | ○ |
|  | WL11 | ○ | ○ | ○ | ○ | ○ | ○ | ○ | ○ |
|  | WL12 | ○ | W7 | W4 | W1 | ○ | ○ | ○ | ○ |
|  | WL13 | ○ | ○ | ○ | ○ | ○ | ○ | ○ | ○ |
|  | WL14 | ○ | ○ | ○ | ○ | ○ | ○ | ○ | ○ |
|  | WL15 | ○ | ○ | W7 | W4 | ○ | ○ | ○ | ○ |
|  | WL16 | ○ | ○ | ○ | ○ | ○ | ○ | ○ | ○ |
|  | WL17 | ○ | ○ | ○ | ○ | ○ | ○ | ○ | ○ |
|  | WL18 | ○ | ○ | ○ | W7 | ○ | ○ | ○ | ○ |
|  | WL19 | W2 | ○ | ○ | ○ | W1 | ○ | ○ | ○ |
|  | WL20 | W3 | ○ | ○ | ○ | W2 | ○ | ○ | ○ |
|  | WL21 | ○ | ○ | ○ | ○ | W3 | ○ | ○ | ○ |
|  | WL22 | W5 | W2 | ○ | ○ | W4 | W1 | ○ | ○ |
|  | WL23 | W6 | W3 | ○ | ○ | W5 | W2 | ○ | ○ |
|  | WL24 | ○ | ○ | ○ | ○ | W6 | W3 | ○ | ○ |
|  | WL25 | W8 | W5 | W2 | ○ | W7 | W4 | W1 | ○ |
|  | WL26 | W9 | W6 | W3 | ○ | W8 | W5 | W2 | ○ |
|  | WL27 | ○ | ○ | ○ | ○ | W9 | W6 | W3 | ○ |
|  | WL28 | ○ | W8 | W5 | W2 | ○ | W7 | W4 | W1 |
|  | WL29 | ○ | W9 | W6 | W3 | ○ | W8 | W5 | W2 |
|  | WL30 | ○ | ○ | ○ | ○ | ○ | W9 | W6 | W3 |
|  | WL31 | ○ | ○ | W8 | W5 | ○ | ○ | W7 | W4 |
|  | WL32 | ○ | ○ | W9 | W6 | ○ | ○ | W8 | W5 |
|  | WL33 | ○ | ○ | ○ | ○ | ○ | ○ | W9 | W6 |
|  | WL34 | ○ | ○ | ○ | W8 | ○ | ○ | ○ | W7 |
|  | WL35 | ○ | ○ | ○ | W9 | ○ | ○ | ○ | W8 |
|  | WL36 | ○ | ○ | ○ | ○ | ○ | ○ | ○ | W9 |
|  |  | L9 | L10 | L11 | L12 | L13 | L14 | L15 | L16 |

FIG. 9B second cycle 800

|  |  | BL1 | BL2 | BL3 | BL4 | BL5 | BL6 | BL7 | BL8 |
|---|---|---|---|---|---|---|---|---|---|
|  | WL1 | W1 | ○ | ○ | ○ | ○ | ○ | ○ | ○ |
|  | WL2 | W2 | ○ | ○ | ○ | W1 | ○ | ○ | ○ |
|  | WL3 | W3 | ○ | ○ | ○ | W2 | ○ | ○ | ○ |
|  | WL4 | W4 | W1 | ○ | ○ | ○ | ○ | ○ | ○ |
|  | WL5 | W5 | W2 | ○ | ○ | W4 | W1 | ○ | ○ |
|  | WL6 | W6 | W3 | ○ | ○ | W5 | W2 | ○ | ○ |
|  | WL7 | W7 | W4 | W1 | ○ | ○ | ○ | ○ | ○ |
|  | WL8 | W8 | W5 | W2 | ○ | W7 | W4 | W1 | ○ |
|  | WL9 | W9 | W6 | W3 | ○ | W8 | W5 | W2 | ○ |
| IN2-1 | WL10 | ○ | W7 | W4 | W1 | ○ | ○ | ○ | ○ |
| IN2-2 | WL11 | ○ | W8 | W5 | W2 | ○ | W7 | W4 | W1 |
| IN2-3 | WL12 | ○ | W9 | W6 | W3 | ○ | W8 | W5 | W2 |
| IN2-4 | WL13 | ○ | ○ | W7 | W4 | ○ | ○ | ○ | ○ |
| IN2-5 | WL14 | ○ | ○ | W8 | W5 | ○ | ○ | W7 | W4 |
| IN2-6 | WL15 | ○ | ○ | W9 | W6 | ○ | ○ | W8 | W5 |
| IN2-7 | WL16 | ○ | ○ | ○ | W7 | ○ | ○ | ○ | ○ |
| IN2-8 | WL17 | ○ | ○ | ○ | W8 | ○ | ○ | ○ | W7 |
| IN2-9 | WL18 | ○ | ○ | ○ | W9 | ○ | ○ | ○ | W8 |
|  | WL19 | ○ | ○ | ○ | ○ | W3 | ○ | ○ | ○ |
|  | WL20 | ○ | ○ | ○ | ○ | ○ | ○ | ○ | ○ |
|  | WL21 | ○ | ○ | ○ | ○ | ○ | ○ | ○ | ○ |
|  | WL22 | ○ | ○ | ○ | ○ | W6 | W3 | ○ | ○ |
|  | WL23 | ○ | ○ | ○ | ○ | ○ | ○ | ○ | ○ |
|  | WL24 | ○ | ○ | ○ | ○ | ○ | ○ | ○ | ○ |
|  | WL25 | ○ | ○ | ○ | ○ | W9 | W6 | W3 | ○ |
|  | WL26 | ○ | ○ | ○ | ○ | ○ | ○ | ○ | ○ |
|  | WL27 | ○ | ○ | ○ | ○ | ○ | ○ | ○ | ○ |
|  | WL28 | ○ | ○ | ○ | ○ | ○ | W9 | W6 | W3 |
|  | WL29 | ○ | ○ | ○ | ○ | ○ | ○ | ○ | ○ |
|  | WL30 | ○ | ○ | ○ | ○ | ○ | ○ | ○ | ○ |
|  | WL31 | ○ | ○ | ○ | ○ | ○ | ○ | W9 | W6 |
|  | WL32 | ○ | ○ | ○ | ○ | ○ | ○ | ○ | ○ |
|  | WL33 | ○ | ○ | ○ | ○ | ○ | ○ | ○ | ○ |
|  | WL34 | ○ | ○ | ○ | ○ | ○ | ○ | ○ | W9 |
|  | WL35 | ○ | ○ | ○ | ○ | ○ | ○ | ○ | ○ |
|  | WL36 | ○ | ○ | ○ | ○ | ○ | ○ | ○ | ○ |
|  |  | L1 | L2 | L3 | L4 | L5 | L6 | L7 | L8 |

FIG. 9C second cycle  800

|       |      | BL9 | BL10 | BL11 | BL12 | BL13 | BL14 | BL15 | BL16 |
|-------|------|-----|------|------|------|------|------|------|------|
|       | WL1  | ○   | ○    | ○    | ○    | ○    | ○    | ○    | ○    |
|       | WL2  | ○   | ○    | ○    | ○    | ○    | ○    | ○    | ○    |
|       | WL3  | W1  | ○    | ○    | ○    | ○    | ○    | ○    | ○    |
|       | WL4  | ○   | ○    | ○    | ○    | ○    | ○    | ○    | ○    |
|       | WL5  | ○   | ○    | ○    | ○    | ○    | ○    | ○    | ○    |
|       | WL6  | W4  | W1   | ○    | ○    | ○    | ○    | ○    | ○    |
|       | WL7  | ○   | ○    | ○    | ○    | ○    | ○    | ○    | ○    |
|       | WL8  | ○   | ○    | ○    | ○    | ○    | ○    | ○    | ○    |
|       | WL9  | W7  | W4   | W1   | ○    | ○    | ○    | ○    | ○    |
| IN2-1 | WL10 | ○   | ○    | ○    | ○    | ○    | ○    | ○    | ○    |
| IN2-2 | WL11 | ○   | ○    | ○    | ○    | ○    | ○    | ○    | ○    |
| IN2-3 | WL12 | ○   | W7   | W4   | W1   | ○    | ○    | ○    | ○    |
| IN2-4 | WL13 | ○   | ○    | ○    | ○    | ○    | ○    | ○    | ○    |
| IN2-5 | WL14 | ○   | ○    | ○    | ○    | ○    | ○    | ○    | ○    |
| IN2-6 | WL15 | ○   | ○    | W7   | W4   | ○    | ○    | ○    | ○    |
| IN2-7 | WL16 | ○   | ○    | ○    | ○    | ○    | ○    | ○    | ○    |
| IN2-8 | WL17 | ○   | ○    | ○    | ○    | ○    | ○    | ○    | ○    |
| IN2-9 | WL18 | ○   | ○    | ○    | W7   | ○    | ○    | ○    | ○    |
|       | WL19 | W2  | ○    | ○    | ○    | W1   | ○    | ○    | ○    |
|       | WL20 | W3  | ○    | ○    | ○    | W2   | ○    | ○    | ○    |
|       | WL21 | ○   | ○    | ○    | ○    | W3   | ○    | ○    | ○    |
|       | WL22 | W5  | W2   | ○    | ○    | W4   | W1   | ○    | ○    |
|       | WL23 | W6  | W3   | ○    | ○    | W5   | W2   | ○    | ○    |
|       | WL24 | ○   | ○    | ○    | ○    | W6   | W3   | ○    | ○    |
|       | WL25 | W8  | W5   | W2   | ○    | W7   | W4   | W1   | ○    |
|       | WL26 | W9  | W6   | W3   | ○    | W8   | W5   | W2   | ○    |
|       | WL27 | ○   | ○    | ○    | ○    | W9   | W6   | W3   | ○    |
|       | WL28 | ○   | W8   | W5   | W2   | ○    | W7   | W4   | W1   |
|       | WL29 | ○   | W9   | W6   | W3   | ○    | W8   | W5   | W2   |
|       | WL30 | ○   | ○    | ○    | ○    | ○    | W9   | W6   | W3   |
|       | WL31 | ○   | ○    | W8   | W5   | ○    | ○    | W7   | W4   |
|       | WL32 | ○   | ○    | W9   | W6   | ○    | ○    | W8   | W5   |
|       | WL33 | ○   | ○    | ○    | ○    | ○    | ○    | W9   | W6   |
|       | WL34 | ○   | ○    | ○    | W8   | ○    | ○    | ○    | W7   |
|       | WL35 | ○   | ○    | ○    | W9   | ○    | ○    | ○    | W8   |
|       | WL36 | ○   | ○    | ○    | ○    | ○    | ○    | ○    | W9   |
|       |      | L9  | L10  | L11  | L12  | L13  | L14  | L15  | L16  |

FIG. 9D third cycle    800

|  |  | BL1 | BL2 | BL3 | BL4 | BL5 | BL6 | BL7 | BL8 |
|---|---|---|---|---|---|---|---|---|---|
|  | WL1 | W1 | ○ | ○ | ○ | ○ | ○ | ○ | ○ |
|  | WL2 | W2 | ○ | ○ | ○ | W1 | ○ | ○ | ○ |
|  | WL3 | W3 | ○ | ○ | ○ | W2 | ○ | ○ | ○ |
|  | WL4 | W4 | W1 | ○ | ○ | ○ | ○ | ○ | ○ |
|  | WL5 | W5 | W2 | ○ | ○ | W4 | W1 | ○ | ○ |
|  | WL6 | W6 | W3 | ○ | ○ | W5 | W2 | ○ | ○ |
|  | WL7 | W7 | W4 | W1 | ○ | ○ | ○ | ○ | ○ |
|  | WL8 | W8 | W5 | W2 | ○ | W7 | W4 | W1 | ○ |
|  | WL9 | W9 | W6 | W3 | ○ | W8 | W5 | W2 | ○ |
|  | WL10 | ○ | W7 | W4 | W1 | ○ | ○ | ○ | ○ |
|  | WL11 | ○ | W8 | W5 | W2 | ○ | W7 | W4 | W1 |
|  | WL12 | ○ | W9 | W6 | W3 | ○ | W8 | W5 | W2 |
|  | WL13 | ○ | ○ | W7 | W4 | ○ | ○ | ○ | ○ |
|  | WL14 | ○ | ○ | W8 | W5 | ○ | ○ | W7 | W4 |
|  | WL15 | ○ | ○ | W9 | W6 | ○ | ○ | W8 | W5 |
|  | WL16 | ○ | ○ | ○ | W7 | ○ | ○ | ○ | ○ |
|  | WL17 | ○ | ○ | ○ | W8 | ○ | ○ | ○ | W7 |
|  | WL18 | ○ | ○ | ○ | W9 | ○ | ○ | ○ | W8 |
| IN3-1 | WL19 | ○ | ○ | ○ | ○ | W3 | ○ | ○ | ○ |
| IN3-2 | WL20 | ○ | ○ | ○ | ○ | ○ | ○ | ○ | ○ |
| IN3-3 | WL21 | ○ | ○ | ○ | ○ | ○ | ○ | ○ | ○ |
| IN3-4 | WL22 | ○ | ○ | ○ | ○ | W6 | W3 | ○ | ○ |
| IN3-5 | WL23 | ○ | ○ | ○ | ○ | ○ | ○ | ○ | ○ |
| IN3-6 | WL24 | ○ | ○ | ○ | ○ | ○ | ○ | ○ | ○ |
| IN3-7 | WL25 | ○ | ○ | ○ | ○ | W9 | W6 | W3 | ○ |
| IN3-8 | WL26 | ○ | ○ | ○ | ○ | ○ | ○ | ○ | ○ |
| IN3-9 | WL27 | ○ | ○ | ○ | ○ | ○ | ○ | ○ | ○ |
|  | WL28 | ○ | ○ | ○ | ○ | ○ | W9 | W6 | W3 |
|  | WL29 | ○ | ○ | ○ | ○ | ○ | ○ | ○ | ○ |
|  | WL30 | ○ | ○ | ○ | ○ | ○ | ○ | ○ | ○ |
|  | WL31 | ○ | ○ | ○ | ○ | ○ | ○ | W9 | W6 |
|  | WL32 | ○ | ○ | ○ | ○ | ○ | ○ | ○ | ○ |
|  | WL33 | ○ | ○ | ○ | ○ | ○ | ○ | ○ | ○ |
|  | WL34 | ○ | ○ | ○ | ○ | ○ | ○ | ○ | W9 |
|  | WL35 | ○ | ○ | ○ | ○ | ○ | ○ | ○ | ○ |
|  | WL36 | ○ | ○ | ○ | ○ | ○ | ○ | ○ | ○ |
|  |  | L1 | L2 | L3 | L4 | L5 | L6 | L7 | L8 |

FIG. 9E third cycle  800

|  |  | BL9 | BL10 | BL11 | BL12 | BL13 | BL14 | BL15 | BL16 |
|---|---|---|---|---|---|---|---|---|---|
|  | WL1 | ○ | ○ | ○ | ○ | ○ | ○ | ○ | ○ |
|  | WL2 | ○ | ○ | ○ | ○ | ○ | ○ | ○ | ○ |
|  | WL3 | W1 | ○ | ○ | ○ | ○ | ○ | ○ | ○ |
|  | WL4 | ○ | ○ | ○ | ○ | ○ | ○ | ○ | ○ |
|  | WL5 | ○ | ○ | ○ | ○ | ○ | ○ | ○ | ○ |
|  | WL6 | W4 | W1 | ○ | ○ | ○ | ○ | ○ | ○ |
|  | WL7 | ○ | ○ | ○ | ○ | ○ | ○ | ○ | ○ |
|  | WL8 | ○ | ○ | ○ | ○ | ○ | ○ | ○ | ○ |
|  | WL9 | W7 | W4 | W1 | ○ | ○ | ○ | ○ | ○ |
|  | WL10 | ○ | ○ | ○ | ○ | ○ | ○ | ○ | ○ |
|  | WL11 | ○ | ○ | ○ | ○ | ○ | ○ | ○ | ○ |
|  | WL12 | ○ | W7 | W4 | W1 | ○ | ○ | ○ | ○ |
|  | WL13 | ○ | ○ | ○ | ○ | ○ | ○ | ○ | ○ |
|  | WL14 | ○ | ○ | ○ | ○ | ○ | ○ | ○ | ○ |
|  | WL15 | ○ | ○ | W7 | W4 | ○ | ○ | ○ | ○ |
|  | WL16 | ○ | ○ | ○ | ○ | ○ | ○ | ○ | ○ |
|  | WL17 | ○ | ○ | ○ | ○ | ○ | ○ | ○ | ○ |
|  | WL18 | ○ | ○ | ○ | W7 | ○ | ○ | ○ | ○ |
| IN3-1 | WL19 | W2 | ○ | ○ | ○ | W1 | ○ | ○ | ○ |
| IN3-2 | WL20 | W3 | ○ | ○ | ○ | W2 | ○ | ○ | ○ |
| IN3-3 | WL21 | ○ | ○ | ○ | ○ | W3 | ○ | ○ | ○ |
| IN3-4 | WL22 | W5 | W2 | ○ | ○ | W4 | W1 | ○ | ○ |
| IN3-5 | WL23 | W6 | W3 | ○ | ○ | W5 | W2 | ○ | ○ |
| IN3-6 | WL24 | ○ | ○ | ○ | ○ | W6 | W3 | ○ | ○ |
| IN3-7 | WL25 | W8 | W5 | W2 | ○ | W7 | W4 | W1 | ○ |
| IN3-8 | WL26 | W9 | W6 | W3 | ○ | W8 | W5 | W2 | ○ |
| IN3-9 | WL27 | ○ | ○ | ○ | ○ | W9 | W6 | W3 | ○ |
|  | WL28 | ○ | W8 | W5 | W2 | ○ | W7 | W4 | W1 |
|  | WL29 | ○ | W9 | W6 | W3 | ○ | W8 | W5 | W2 |
|  | WL30 | ○ | ○ | ○ | ○ | ○ | W9 | W6 | W3 |
|  | WL31 | ○ | ○ | W8 | W5 | ○ | ○ | W7 | W4 |
|  | WL32 | ○ | ○ | W9 | W6 | ○ | ○ | W8 | W5 |
|  | WL33 | ○ | ○ | ○ | ○ | ○ | ○ | W9 | W6 |
|  | WL34 | ○ | ○ | ○ | W8 | ○ | ○ | ○ | W7 |
|  | WL35 | ○ | ○ | ○ | W9 | ○ | ○ | ○ | W8 |
|  | WL36 | ○ | ○ | ○ | ○ | ○ | ○ | ○ | W9 |
|  |  | L9 | L10 | L11 | L12 | L13 | L14 | L15 | L16 |

FIG. 9F fourth cycle  800

|  |  | BL1 | BL2 | BL3 | BL4 | BL5 | BL6 | BL7 | BL8 |
|---|---|---|---|---|---|---|---|---|---|
|  | WL1 | W1 | ○ | ○ | ○ | ○ | ○ | ○ | ○ |
|  | WL2 | W2 | ○ | ○ | ○ | W1 | ○ | ○ | ○ |
|  | WL3 | W3 | ○ | ○ | ○ | W2 | ○ | ○ | ○ |
|  | WL4 | W4 | W1 | ○ | ○ | ○ | ○ | ○ | ○ |
|  | WL5 | W5 | W2 | ○ | ○ | W4 | W1 | ○ | ○ |
|  | WL6 | W6 | W3 | ○ | ○ | W5 | W2 | ○ | ○ |
|  | WL7 | W7 | W4 | W1 | ○ | ○ | ○ | ○ | ○ |
|  | WL8 | W8 | W5 | W2 | ○ | W7 | W4 | W1 | ○ |
|  | WL9 | W9 | W6 | W3 | ○ | W8 | W5 | W2 | ○ |
|  | WL10 | ○ | W7 | W4 | W1 | ○ | ○ | ○ | ○ |
|  | WL11 | ○ | W8 | W5 | W2 | ○ | W7 | W4 | W1 |
|  | WL12 | ○ | W9 | W6 | W3 | ○ | W8 | W5 | W2 |
|  | WL13 | ○ | ○ | W7 | W4 | ○ | ○ | ○ | ○ |
|  | WL14 | ○ | ○ | W8 | W5 | ○ | ○ | W7 | W4 |
|  | WL15 | ○ | ○ | W9 | W6 | ○ | ○ | W8 | W5 |
|  | WL16 | ○ | ○ | ○ | W7 | ○ | ○ | ○ | ○ |
|  | WL17 | ○ | ○ | ○ | W8 | ○ | ○ | ○ | W7 |
|  | WL18 | ○ | ○ | ○ | W9 | ○ | ○ | ○ | W8 |
|  | WL19 | ○ | ○ | ○ | ○ | W3 | ○ | ○ | ○ |
|  | WL20 | ○ | ○ | ○ | ○ | ○ | ○ | ○ | ○ |
|  | WL21 | ○ | ○ | ○ | ○ | ○ | ○ | ○ | ○ |
|  | WL22 | ○ | ○ | ○ | ○ | W6 | W3 | ○ | ○ |
|  | WL23 | ○ | ○ | ○ | ○ | ○ | ○ | ○ | ○ |
|  | WL24 | ○ | ○ | ○ | ○ | ○ | ○ | ○ | ○ |
|  | WL25 | ○ | ○ | ○ | ○ | W9 | W6 | W3 | ○ |
|  | WL26 | ○ | ○ | ○ | ○ | ○ | ○ | ○ | ○ |
|  | WL27 | ○ | ○ | ○ | ○ | ○ | ○ | ○ | ○ |
| IN4-1 | WL28 | ○ | ○ | ○ | ○ | ○ | W9 | W6 | W3 |
| IN4-2 | WL29 | ○ | ○ | ○ | ○ | ○ | ○ | ○ | ○ |
| IN4-3 | WL30 | ○ | ○ | ○ | ○ | ○ | ○ | ○ | ○ |
| IN4-4 | WL31 | ○ | ○ | ○ | ○ | ○ | ○ | W9 | W6 |
| IN4-5 | WL32 | ○ | ○ | ○ | ○ | ○ | ○ | ○ | ○ |
| IN4-6 | WL33 | ○ | ○ | ○ | ○ | ○ | ○ | ○ | ○ |
| IN4-7 | WL34 | ○ | ○ | ○ | ○ | ○ | ○ | ○ | W9 |
| IN4-8 | WL35 | ○ | ○ | ○ | ○ | ○ | ○ | ○ | ○ |
| IN4-9 | WL36 | ○ | ○ | ○ | ○ | ○ | ○ | ○ | ○ |
|  |  | L1 | L2 | L3 | L4 | L5 | L6 | L7 | L8 |

FIG. 9G fourth cycle  800

|  |  | BL9 | BL10 | BL11 | BL12 | BL13 | BL14 | BL15 | BL16 |
|---|---|---|---|---|---|---|---|---|---|
|  | WL1 | ○ | ○ | ○ | ○ | ○ | ○ | ○ | ○ |
|  | WL2 | ○ | ○ | ○ | ○ | ○ | ○ | ○ | ○ |
|  | WL3 | W1 | ○ | ○ | ○ | ○ | ○ | ○ | ○ |
|  | WL4 | ○ | ○ | ○ | ○ | ○ | ○ | ○ | ○ |
|  | WL5 | ○ | ○ | ○ | ○ | ○ | ○ | ○ | ○ |
|  | WL6 | W4 | W1 | ○ | ○ | ○ | ○ | ○ | ○ |
|  | WL7 | ○ | ○ | ○ | ○ | ○ | ○ | ○ | ○ |
|  | WL8 | ○ | ○ | ○ | ○ | ○ | ○ | ○ | ○ |
|  | WL9 | W7 | W4 | W1 | ○ | ○ | ○ | ○ | ○ |
|  | WL10 | ○ | ○ | ○ | ○ | ○ | ○ | ○ | ○ |
|  | WL11 | ○ | ○ | ○ | ○ | ○ | ○ | ○ | ○ |
|  | WL12 | ○ | W7 | W4 | W1 | ○ | ○ | ○ | ○ |
|  | WL13 | ○ | ○ | ○ | ○ | ○ | ○ | ○ | ○ |
|  | WL14 | ○ | ○ | ○ | ○ | ○ | ○ | ○ | ○ |
|  | WL15 | ○ | ○ | W7 | W4 | ○ | ○ | ○ | ○ |
|  | WL16 | ○ | ○ | ○ | ○ | ○ | ○ | ○ | ○ |
|  | WL17 | ○ | ○ | ○ | ○ | ○ | ○ | ○ | ○ |
|  | WL18 | ○ | ○ | ○ | W7 | ○ | ○ | ○ | ○ |
|  | WL19 | W2 | ○ | ○ | ○ | W1 | ○ | ○ | ○ |
|  | WL20 | W3 | ○ | ○ | ○ | W2 | ○ | ○ | ○ |
|  | WL21 | ○ | ○ | ○ | ○ | W3 | ○ | ○ | ○ |
|  | WL22 | W5 | W2 | ○ | ○ | W4 | W1 | ○ | ○ |
|  | WL23 | W6 | W3 | ○ | ○ | W5 | W2 | ○ | ○ |
|  | WL24 | ○ | ○ | ○ | ○ | W6 | W3 | ○ | ○ |
|  | WL25 | W8 | W5 | W2 | ○ | W7 | W4 | W1 | ○ |
|  | WL26 | W9 | W6 | W3 | ○ | W8 | W5 | W2 | ○ |
|  | WL27 | ○ | ○ | ○ | ○ | W9 | W6 | W3 | ○ |
| IN4-1 | WL28 | ○ | W8 | W5 | W2 | ○ | W7 | W4 | W1 |
| IN4-2 | WL29 | ○ | W9 | W6 | W3 | ○ | W8 | W5 | W2 |
| IN4-3 | WL30 | ○ | ○ | ○ | ○ | ○ | W9 | W6 | W3 |
| IN4-4 | WL31 | ○ | ○ | W8 | W5 | ○ | ○ | W7 | W4 |
| IN4-5 | WL32 | ○ | ○ | W9 | W6 | ○ | ○ | W8 | W5 |
| IN4-6 | WL33 | ○ | ○ | ○ | ○ | ○ | ○ | W9 | W6 |
| IN4-7 | WL34 | ○ | ○ | ○ | W8 | ○ | ○ | ○ | W7 |
| IN4-8 | WL35 | ○ | ○ | ○ | W9 | ○ | ○ | ○ | W8 |
| IN4-9 | WL36 | ○ | ○ | ○ | ○ | ○ | ○ | ○ | W9 |
|  |  | L9 | L10 | L11 | L12 | L13 | L14 | L15 | L16 |

FIG. 9H

| FIG. 11A | FIG. 11B |

1100

|  | BL1 | BL2 | BL3 | BL4 | BL5 | BL6 |
|---|---|---|---|---|---|---|
| WL1 | W1 | ○ | ○ | ○ | ○ | ○ |
| WL2 | W2 | ○ | ○ | ○ | W1 | ○ |
| WL3 | W3 | ○ | ○ | ○ | W2 | ○ |
| WL4 | W4 | W1 | ○ | ○ | ○ | ○ |
| WL5 | W5 | W2 | ○ | ○ | W4 | W1 |
| WL6 | W6 | W3 | ○ | ○ | W5 | W2 |
| WL7 | W7 | W4 | W1 | ○ | ○ | ○ |
| WL8 | W8 | W5 | W2 | ○ | W7 | W4 |
| WL9 | W9 | W6 | W3 | ○ | W8 | W5 |
| WL10 | ○ | W7 | W4 | W1 | ○ | ○ |
| WL11 | ○ | W8 | W5 | W2 | ○ | W7 |
| WL12 | ○ | W9 | W6 | W3 | ○ | W8 |
| WL13 | ○ | ○ | W7 | W4 | ○ | ○ |
| WL14 | ○ | ○ | W8 | W5 | ○ | ○ |
| WL15 | ○ | ○ | W9 | W6 | ○ | ○ |
| WL16 | ○ | ○ | ○ | W7 | ○ | ○ |
| WL17 | ○ | ○ | ○ | W8 | ○ | ○ |
| WL18 | ○ | ○ | ○ | W9 | ○ | ○ |
| WL19 | W1 | ○ | ○ | ○ | W3 | ○ |
| WL20 | W2 | ○ | ○ | ○ | ○ | ○ |
| WL21 | W3 | ○ | ○ | ○ | ○ | ○ |
| WL22 | W4 | W1 | ○ | ○ | W6 | W3 |
| WL23 | W5 | W2 | ○ | ○ | ○ | ○ |
| WL24 | W6 | W3 | ○ | ○ | ○ | ○ |
| WL25 | W7 | W4 | W1 | ○ | W9 | W6 |
| WL26 | W8 | W5 | W2 | ○ | ○ | ○ |
| WL27 | W9 | W6 | W3 | ○ | ○ | ○ |
| WL28 | ○ | W7 | W4 | W1 | ○ | W9 |
| WL29 | ○ | W8 | W5 | W2 | ○ | ○ |
| WL30 | ○ | W9 | W6 | W3 | ○ | ○ |
| WL31 | ○ | ○ | W7 | W4 | ○ | ○ |
| WL32 | ○ | ○ | W8 | W5 | ○ | ○ |
| WL33 | ○ | ○ | W9 | W6 | ○ | ○ |
| WL34 | ○ | ○ | ○ | W7 | ○ | ○ |
| WL35 | ○ | ○ | ○ | W8 | ○ | ○ |
| WL36 | ○ | ○ | ○ | W9 | ○ | ○ |
|  | L1 | L2 | L3 | L4 | L5 | L6 |

FIG. 11A

| FIG. 11A | FIG. 11B |

1100

|  | BL7 | BL8 | BL9 | BL10 | BL11 | BL12 |
|---|---|---|---|---|---|---|
| WL1 | ○ | ○ | ○ | ○ | ○ | ○ |
| WL2 | ○ | ○ | ○ | ○ | ○ | ○ |
| WL3 | ○ | ○ | W1 | ○ | ○ | ○ |
| WL4 | ○ | ○ | ○ | ○ | ○ | ○ |
| WL5 | ○ | ○ | ○ | ○ | ○ | ○ |
| WL6 | ○ | ○ | W4 | W1 | ○ | ○ |
| WL7 | ○ | ○ | ○ | ○ | ○ | ○ |
| WL8 | W1 | ○ | ○ | ○ | ○ | ○ |
| WL9 | W2 | ○ | W7 | W4 | W1 | ○ |
| WL10 | ○ | ○ | ○ | ○ | ○ | ○ |
| WL11 | W4 | W1 | ○ | ○ | ○ | ○ |
| WL12 | W5 | W2 | ○ | W7 | W4 | W1 |
| WL13 | ○ | ○ | ○ | ○ | ○ | ○ |
| WL14 | W7 | W4 | ○ | ○ | ○ | ○ |
| WL15 | W8 | W5 | ○ | ○ | W7 | W4 |
| WL16 | ○ | ○ | ○ | ○ | ○ | ○ |
| WL17 | ○ | W7 | ○ | ○ | ○ | ○ |
| WL18 | ○ | W8 | ○ | ○ | ○ | W7 |
| WL19 | ○ | ○ | W2 | ○ | ○ | ○ |
| WL20 | ○ | ○ | W3 | ○ | ○ | ○ |
| WL21 | ○ | ○ | ○ | ○ | ○ | ○ |
| WL22 | ○ | ○ | W5 | W2 | ○ | ○ |
| WL23 | ○ | ○ | W6 | W3 | ○ | ○ |
| WL24 | ○ | ○ | ○ | ○ | ○ | ○ |
| WL25 | W3 | ○ | W8 | W5 | W2 | ○ |
| WL26 | ○ | ○ | W9 | W6 | W3 | ○ |
| WL27 | ○ | ○ | ○ | ○ | ○ | ○ |
| WL28 | W6 | W3 | ○ | W8 | W5 | W2 |
| WL29 | ○ | ○ | ○ | W9 | W6 | W3 |
| WL30 | ○ | ○ | ○ | ○ | ○ | ○ |
| WL31 | W9 | W6 | ○ | ○ | W8 | W5 |
| WL32 | ○ | ○ | ○ | ○ | W9 | W6 |
| WL33 | ○ | ○ | ○ | ○ | ○ | ○ |
| WL34 | ○ | W9 | ○ | ○ | ○ | W8 |
| WL35 | ○ | ○ | ○ | ○ | ○ | W9 |
| WL36 | ○ | ○ | ○ | ○ | ○ | ○ |
|  | L7 | L8 | L9 | L10 | L11 | L12 |

FIG. 11B

MEMORY DEVICE AND COMPUTING IN MEMORY METHOD THEREOF

This application claims the benefit of U.S. provisional application Ser. No. 62/916,797, filed Oct. 18, 2019, the subject matter of which is incorporated herein by reference.

TECHNICAL FIELD

The disclosure relates in general to a memory device and a computing in memory method thereof.

BACKGROUND

In deep learning training, data movement consumes large energy cost. Ideally, computing in memory may reduce 25% energy consumption because movement of weight values is reduced.

FIG. 1 shows performance of MAC (multiplication and accumulation) by computing in memory. Weight values W1-W3 are written into memory cells C1-C3. Input values I1-I3 are written into word lines or bit lines. For example, in FIG. 1, Input data I1-I3 are written into word lines WL1-WL3. Cell currents of the memory cells C1-C3 are I1*W1, I2*W2 and I3*W3, respectively. After the cell currents are sensed by the sensing amplifier (SA) 110, the SA 110 outputs I1*W1+I2*W2+I3*W3.

In computing in memory, taking Covolutional Neural Network (CNN) as an example, when stride operations are performed, it usually takes several cycles to complete the stride operations. Performing stride operations (stride=1) on a 3*3 array (which is a weight array) is taken as an example. FIG. 2 shows nine weights W1-W9 are written into nine memory cells.

Figure 3:
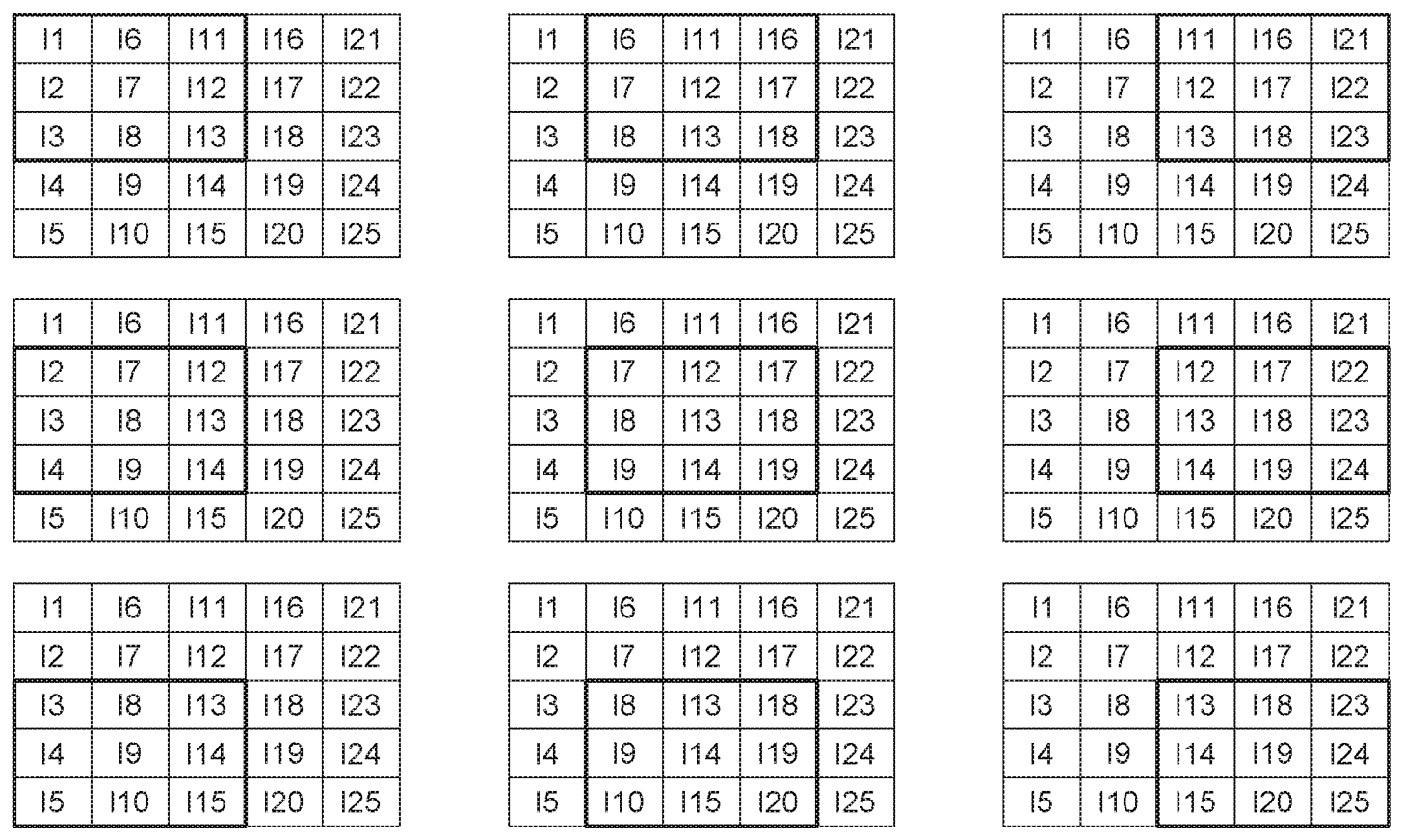

FIG. 3 shows the stride operations (stride=1) on a 3*3 array.

FIG. 4 shows nine cycles for completing the stride operations (stride=1) on a 3*3 array.

In a first cycle, inputs data I1-I3, I6-I8 and I11-I13 are input into the word lines WL1-WL9, respectively. The operations areas bellows.

| First cycle | | |
| --- | --- | --- |
| I1*W1 | I6*W4 | I11*W7 |
| I2*W2 | I7*W5 | I12*W8 |
| I3*W3 | I8*W6 | I13*W9 |

In a second cycle, three bits are updated and thus inputs data I6-I8, I11-I13 and I16-I18 are input into the word lines WL1-WL9, respectively. The operations are as bellows.

| Second cycle | | |
| --- | --- | --- |
| I6*W1 | I11*W4 | I16*W7 |
| I7*W2 | I12*W5 | I17*W8 |
| I8*W3 | I13*W6 | I18*W9 |

In a third cycle, three bits are updated and thus inputs data I11-I13, I16-I18 and I21-I23 are input into the word lines WL1-WL9, respectively. The operations are as bellows.

| Third cycle | | |
| --- | --- | --- |
| I11*W1 | I16*W4 | I21*W7 |
| I12*W2 | I17*W5 | I22*W8 |
| I13*W3 | I18*W6 | I23*W9 |

In a fourth cycle, three bits are updated and thus inputs data I2-I4, I7-I9 and I12-I14 are input into the word lines WL1-WL9, respectively. The operations are as bellows.

| Fourth cycle | | |
| --- | --- | --- |
| I2*W1 | I7*W4 | I12*W7 |
| I3*W2 | I8*W5 | I13*W8 |
| I4*W3 | I9*W6 | I14*W9 |

In a fifth cycle, three bits are updated and thus inputs data I7-I9, I12-I14 and I17-I19 are input into the word lines WL1-WL9, respectively. The operations are as bellows.

| Fifth cycle | | |
| --- | --- | --- |
| I7*W1 | I12*W4 | I17*W7 |
| I8*W2 | I13*W5 | I18*W8 |
| I9*W3 | I14*W6 | I19*W9 |

In a sixth cycle, three bits are updated and thus inputs data I12-I14, I17-I19 and I22-I24 are input into the word lines WL1-WL9, respectively. The operations are as bellows.

| Sixth cycle | | |
| --- | --- | --- |
| I12*W1 | I17*W4 | I22*W7 |
| I13*W2 | I18*W5 | I23*W8 |
| I14*W3 | I19*W6 | I24*W9 |

In a seventh cycle, three bits are updated and thus inputs data I3-I5, I8-I10 and I13-I15 are input into the word lines WL1-WL9, respectively. The operations are as bellows.

| Seventh cycle | | |
| --- | --- | --- |
| I3*W1 | I8*W4 | I13*W7 |
| I4*W2 | I9*W5 | I14*W8 |
| I5*W3 | I10*W6 | I15*W9 |

In an eighth cycle, three bits are updated and thus inputs data I8-I10, I13-I15 and I18-I20 are input into the word lines WL1-WL9, respectively. The operations are as bellows.

| Eighth cycle | | |
| --- | --- | --- |
| I8*W1 | I13*W4 | I18*W7 |
| I9*W2 | I14*W5 | I19*W8 |
| I10*W3 | I15*W6 | I20*W9 |

In a ninth cycle, three bits are updated and thus inputs data I13-I15, I8-I10 and I23-I25 are input into the word lines WL1-WL9, respectively. The operations are as bellows.

| Ninth cycle | | |
| --- | --- | --- |
| I13*W1 | I18*W4 | I23*W7 |
| I14*W2 | I19*W5 | I24*W8 |
| I15*W3 | I20*W6 | I25*W9 |

About the traditional CIM, there exists duplicate feeding of input feature maps. This is because the stride operation will generate a lot of input data having contents overlapping. The traditional CIM usually stores one kernel at one bit line and accordingly, input duplicate feeding is caused.

Input duplicate feeding situation will become worse when input data becomes large and stride step becomes small. Thus, how to reduce the input duplicate feeding is very important. As known, more input duplicate feeding results in more data movement, more energy consumption and reduced operation speed.

Thus, how to reduce data movement, lower energy consumption and improve operation speed are important.

SUMMARY

According to one embodiment, provided is a computing in memory method for a memory device. The computing in memory method includes: based on a stride parameter, unfolding a kernel into a plurality of sub-kernels and a plurality of complement sub-kernels; based on the sub-kernels and the complement sub-kernels, writing a plurality of weights into a plurality of target memory cells of a memory array of the memory device; inputting an input data into a selected word line of the memory array; performing a stride operation in the memory array; temporarily storing a plurality of partial sums; and summing the stored partial sums into a stride operation result when all operation cycles are completed.

According to one embodiment, provided is a memory device comprising: a memory array; and a controller coupled to the memory array, the controller being configured for based on a stride parameter, unfolding a kernel into a plurality of sub-kernels and a plurality of complement sub-kernels; based on the sub-kernels and the complement sub-kernels, writing a plurality of weights into a plurality of target memory cells of a memory array of the memory device; inputting an input data into a selected word line of the memory array; performing a stride operation in the memory array; temporarily storing a plurality of partial sums; and summing the stored partial sums into a stride operation result when all operation cycles are completed.

BRIEF DESCRIPTION OF THE DRAWINGS

FIG. 3 shows the stride operations (stride=1) on a 3*3 array.

FIG. 4 shows nine cycles for completing the stride operations (stride=1) on a 3*3 array.

FIG. 6A and FIG. 6B show to unfold the kernel into a plurality of sub-kernels and a plurality of complement sub-kernels.

FIG. 7A to FIG. 7D show MAC operation according to one embodiment of the application.

FIG. 8A and FIG. 8B show that a plurality of weights are written into a plurality of memory cells of the memory array according to one embodiment of the application.

FIG. 9A to FIG. 9H shows four cycles used to complete MAC operations according to one embodiment of the application.

FIG. 11A and FIG. 11B show that a plurality of weights are written into a plurality of memory cells of the memory array according to one embodiment of the application.

Figures 1, 2:
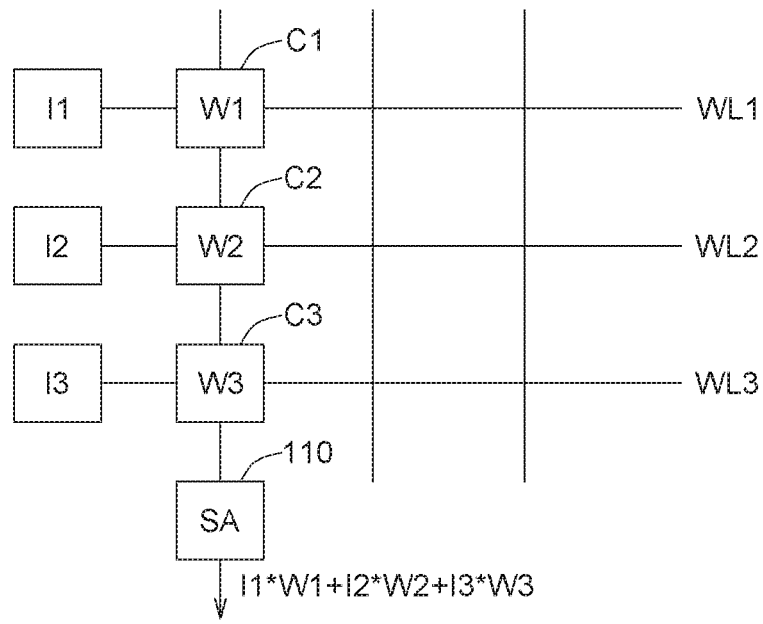
FIG. 1 shows performance of MAC (multiplication and accumulation) by computing in memory.
FIG. 2 shows nine weights W1-W9 are written into nine memory cells.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 5:
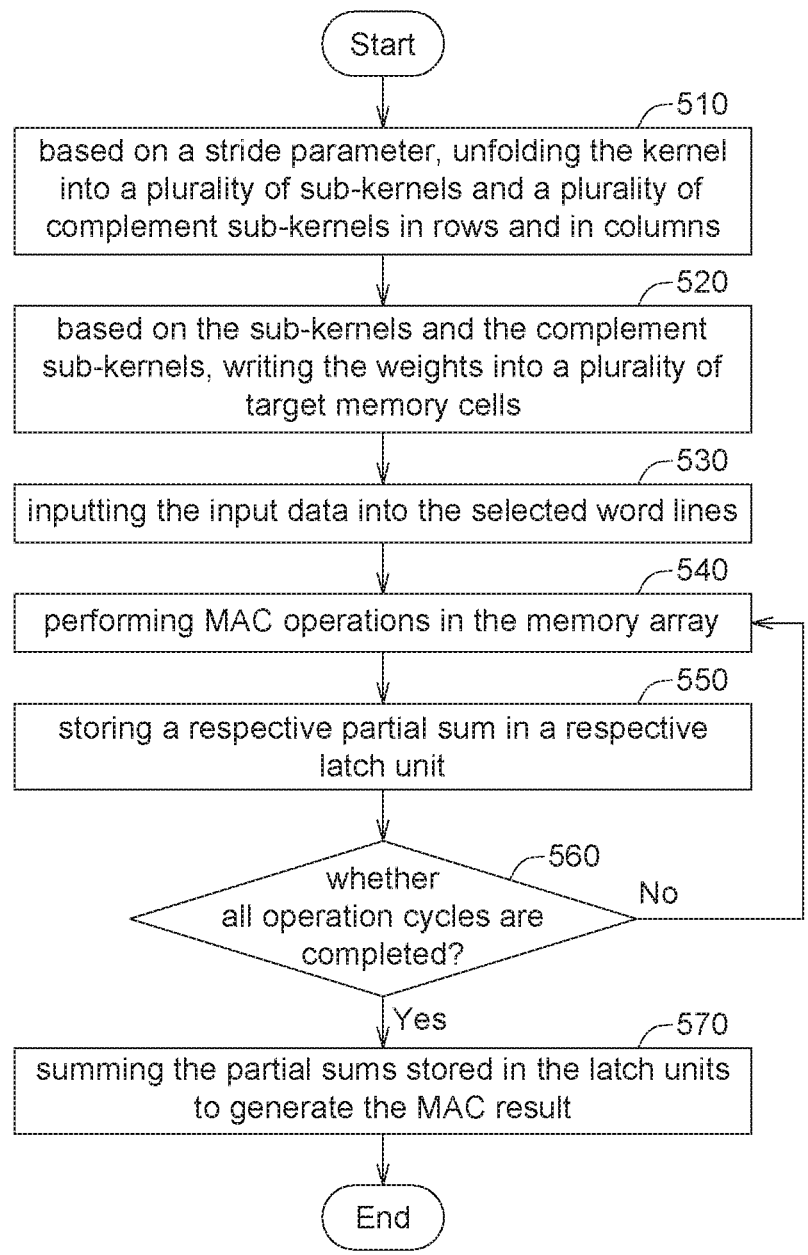
FIG. 5 shows a computing in memory method according to one embodiment of the application.

FIG. 5 shows a computing in memory method according to one embodiment of the application. As shown in FIG. 5, in step 510, based on a stride parameter, the kernel is unfolded into a plurality of sub-kernels and a plurality of complement sub-kernels in rows and in columns. In here, the kernel is for example but not limited by a weight matrix.

Figure 6A:
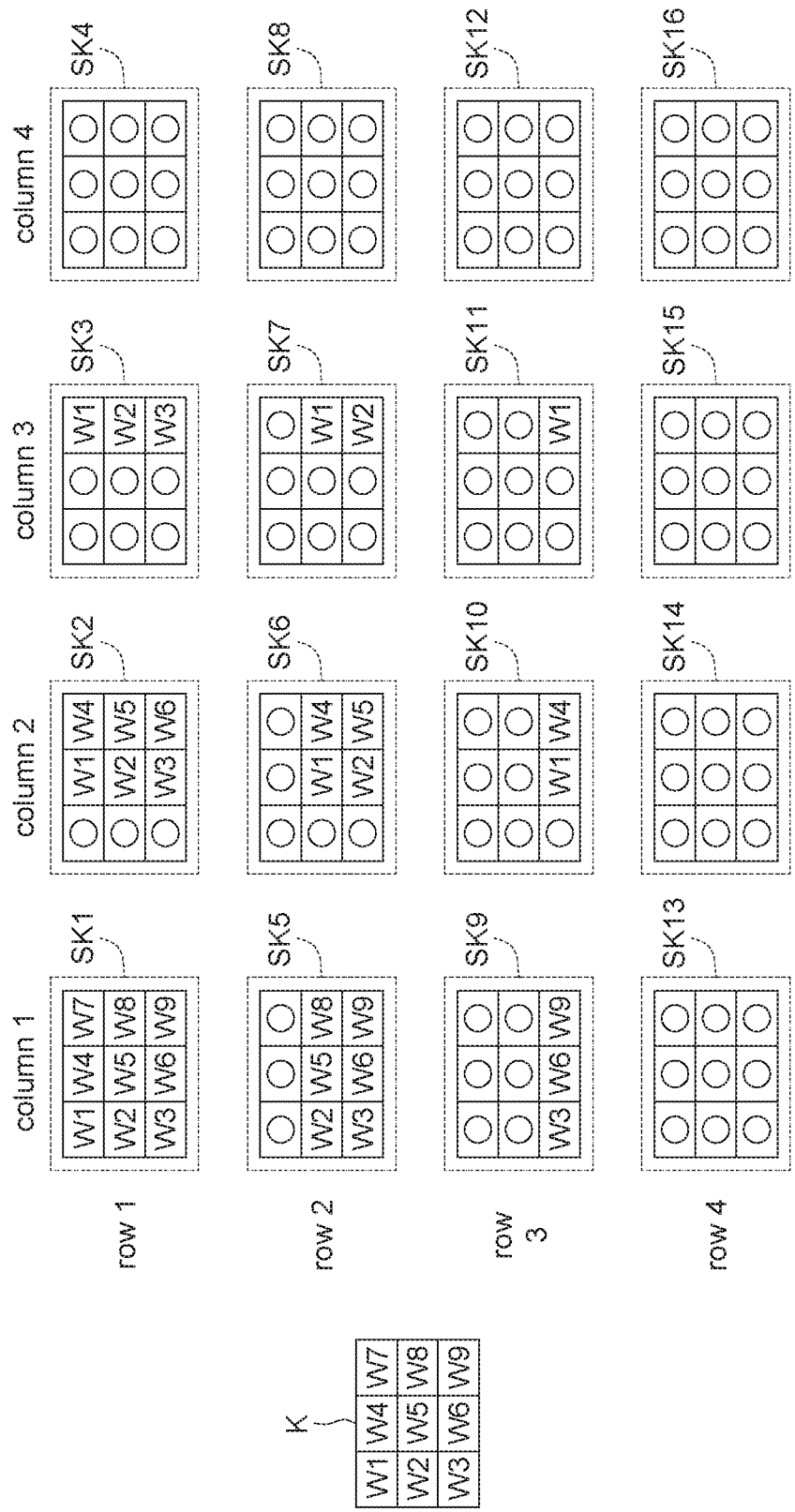
Figure 6B:
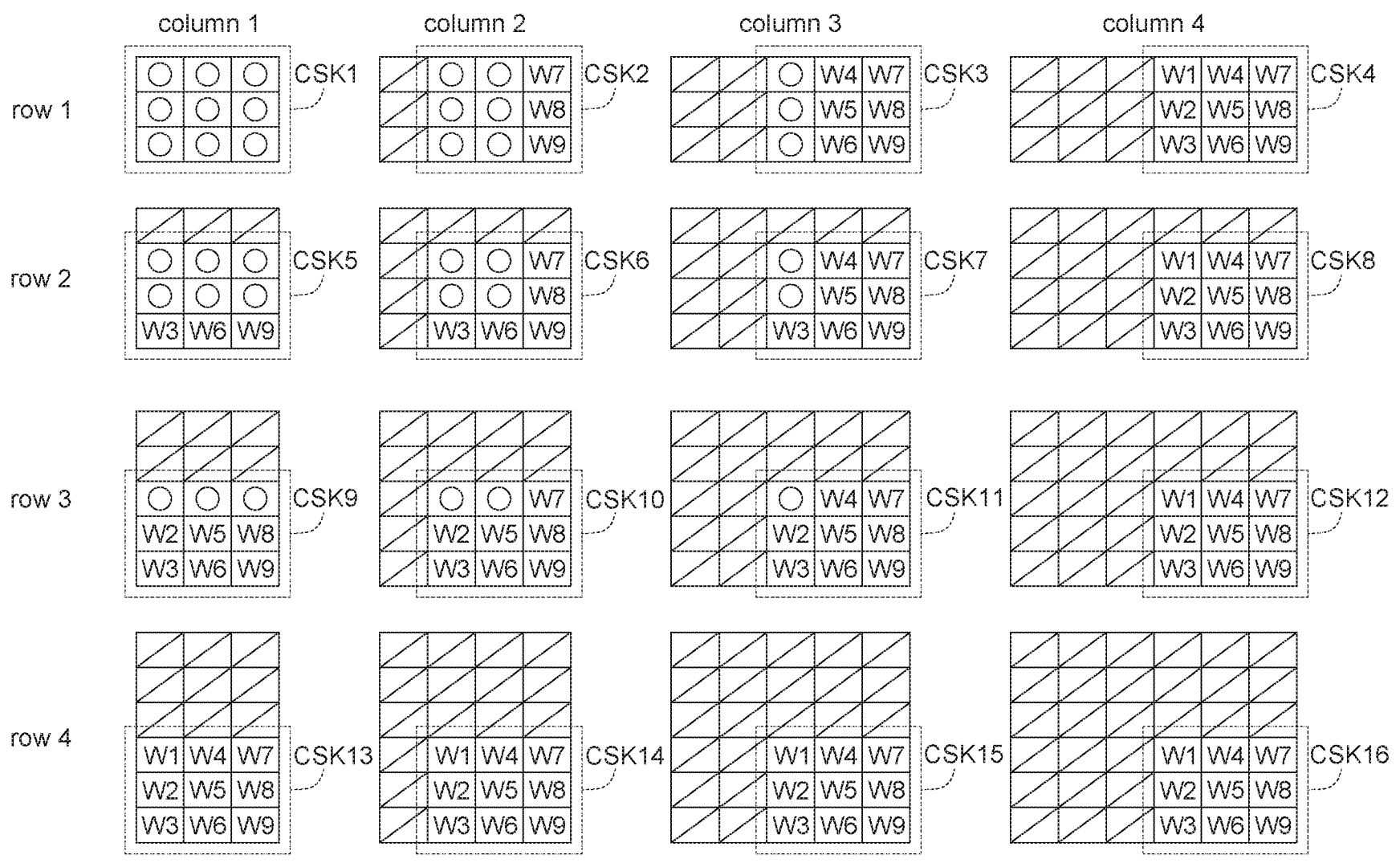

FIG. 6A and FIG. 6B show to unfold the kernel into a plurality of sub-kernels and a plurality of complement sub-kernels. In here, the stride parameter is 1 and the kernel is a 3*3 weight matrix, but the application is not limited by this.

As shown in FIG. 6A, the kernel K is stridden by zero step, one step, two steps and three steps in column direction (i.e. toward right direction) to obtain the sub-kernels SK1, SK2, SK3 and SK4; the sub-kernels SK1, SK2, SK3 and SK4 are stridden by zero step, one step, two steps and three steps in row direction (i.e. toward down direction) to obtain the sub-kernels SK5, SK6, SK7 and SK8; the sub-kernels SK5, SK6, SK7 and SK8 are by stridden zero step, one step, two steps and three steps in row direction (i.e. toward down direction) to obtain the sub-kernels SK9, SK10, SK11 and SK12; and the sub-kernels SK9, SK10, SK11 and SK12 are stridden by zero step, one step, two steps and three steps in row direction (i.e. toward down direction) to obtain the sub-kernels SK13, SK14, SK15 and SK16. Each of the sub-kernels SK1-SK16 is also a 3*3 weight matrix. The sub-kernels SK1-SK16 may be a zero matrix, or the sub-kernels SK1-SK16 may include at least one weight of the kernel K.

As shown in FIG. 6B, the sub-kernels SK1-SK16 are complemented as a plurality of complement sub-kernels CSK1-CSK16. Taking the sub-kernel SK1 as an example, the sub-kernel SK1 includes nine weights W1-W9 and thus after complement, the complement sub-kernel CSK1 includes zero weight (i.e. including nine "0"). Taking the sub-kernel SK2 as an example, the sub-kernel SK2 includes six weights W1-W6 and three "0"; and thus after complement, the complement sub-kernel CSK2 includes three weights W7-W9 and six "0". That is, a sum of the weight number of the sub-kernel and the weight number of the corresponding complement sub-kernel is equal to the weight number of the kernel.

In general, the kernel includes an original weight matrix. When the original weight matrix is k×l (k and l both being a natural number) and the input data is N×M (N and M both being a natural number), for the stride parameter being equal to "1", a total number of the sub-kernels is (N−k+1)×(M−l+1) and a total number of the complement sub-kernels is (N−k+1)×(M−l+1).

In step 520, based on the sub-kernels and the complement sub-kernels, the weights are written into a plurality of target memory cells.

Taken the sub-kernel SK1 in FIG. 6A. The sub-kernel SK1 includes nine weights W1-W9. As for the bit line BL, the weight W1 is written into a memory cell at intersection of the bit line BL1 and the word line WL1; the weight W2 is written into a memory cell at intersection of the bit line BL1 and the word line WL2; the weight W3 is written into a memory cell at intersection of the bit line BL1 and the word line WL3; the weight W4 is written into a memory cell at intersection of the bit line BL1 and the word line WL4; the weight W5 is written into a memory cell at intersection of the bit line BL1 and the word line WL5; the weight W6 is written into a memory cell at intersection of the bit line BL1 and the word line WL6; the weight W7 is written into a memory cell at intersection of the bit line BL1 and the word line WL7; the weight W8 is written into a memory cell at intersection of the bit line BL1 and the word line WL8; and the weight W9 is written into a memory cell at intersection of the bit line BL1 and the word line WL9.

Taken the sub-kernel SK2 in FIG. 6A. The sub-kernel SK2 includes six weights W1-W6 and three "0". As for the bit line BL2, the weight W1 is written into a memory cell at intersection of the bit line BL2 and the word line WL4; the weight W2 is written into a memory cell at intersection of the bit line BL2 and the word line WL5; the weight W3 is written into a memory cell at intersection of the bit line BL2 and the word line WL6; the weight W4 is written into a memory cell at intersection of the bit line BL2 and the word line WL7; the weight W5 is written into a memory cell at intersection of the bit line BL2 and the word line WL8; and the weight W6 is written into a memory cell at intersection of the bit line BL2 and the word line WL9.

In step 530, the input data is input into the selected word lines.

In step 540, MAC operations are performed in the memory array.

In step 550, a respective partial sum is stored in a respective latch unit.

In step 560, it is determined whether the corresponding complement sub-kernel is calculated (or, it is determined whether all operation cycles are completed). If yes in step 560, then the flow proceeds to step 570 to sum the partial sums stored in the latch units to generate the MAC result. If no in step 560, then the flow returns to step 530.

FIG. 7A to FIG. 7D show MAC operation according to one embodiment of the application, wherein the stride parameter is set as one. The application is not limited by this. As shown in FIG. 7A to FIG. 7D, in performing stride operations, when the kernel is a 3*3 matrix and the stride parameter is one, then there are sixteen operations. In operation (a) in FIG. 7A, the input data IN1-1 to IN1-9 are multiplied by the weights W1-W9, respectively. In operation (b) in FIG. 7A, the input data IN1-4 to IN1-9 and IN2-1 to IN2-3 are multiplied by the weights W1-W9, respectively.

In one embodiment of the application, in order to reduce data movement, the weights W1-W9 are written into target memory cells as indicated by sixteen operations shown in FIG. 7A to FIG. 7D.

FIG. 8A and FIG. 8B show that a plurality of weights are written into a plurality of memory cells of the memory array 800 according to one embodiment of the application. FIG. 8A and FIG. 8B show a part of the memory array 800. It is assumed that, in real operations, the input data IN1-1 to IN1-9 are input into the word lines WL1 to WL9; the input data IN2-1 to IN2-9 are input into the word lines WL10 to WL18; the input data IN3-1 to IN3-9 are input into the word lines WL19 to WL27; and the input data IN4-1 to IN4-9 are input into the word lines WL28 to WL36.

Figure 7A:
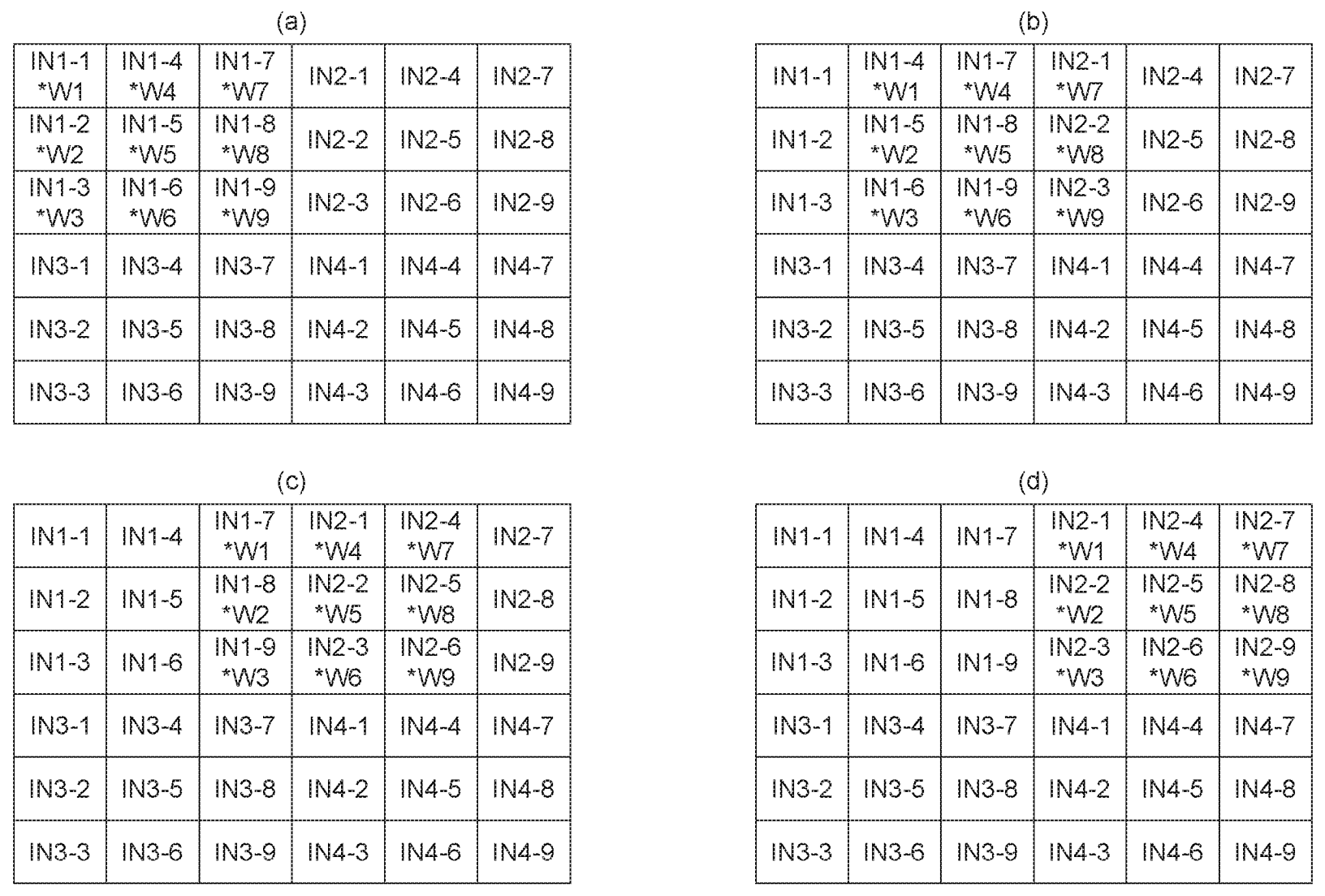

As shown in operation (a) of FIG. 7A, the input data IN1-1 to IN1-9 are multiplied by the weights W1 to W9 and thus the following is obtained: IN1-1*W1+IN1-2*W2+IN1-3*W3+IN1-4*W4+IN1-5*W5+IN1-6*W6+IN1-7*W7+IN1-8*W8+IN1-9*W9. In order to write the weights W1 to W9 to the bit line BL1, the weight W1 is written into a memory cell at intersection of the bit line BL1 and the word line WL1; the weight W2 is written into a memory cell at intersection of the bit line BL1 and the word line WL2; the weight W3 is written into a memory cell at intersection of the bit line BL1 and the word line WL3; the weight W4 is written into a memory cell at intersection of the bit line BL1 and the word line WL4; the weight W5 is written into a memory cell at intersection of the bit line BL1 and the word line WL5; the weight W6 is written into a memory cell at intersection of the bit line BL1 and the word line WL6; the weight W7 is written into a memory cell at intersection of the bit line BL1 and the word line WL7; the weight W8 is written into a memory cell at intersection of the bit line BL1 and the word line WL8; and the weight W9 is written into a memory cell at intersection of the bit line BL1 and the word line WL9. When the input data IN1-1 to IN1-9 are input into the word lines WL1 to WL9, respectively (in the case that the word lines WL1 to WL9 are selected), the latch unit L1 (which is related to the bit line BL1) stores the value of IN1-1*W1+IN1-2*W2+IN1-3*W3+IN1-4*W4+IN1-5*W5+IN1-6*W6+IN1-7*W7+IN1-8*W8+IN1-9*W9.

As shown in operation (b) of FIG. 7A, the input data IN1-4 to IN1-9 and IN2-1 to IN2-3 are multiplied by the weights W1 to W9 and thus the following is obtained: IN1-4*W1+IN1-5*W2+IN1-6*W3+IN1-7*W4+IN1-8*W5+IN1-9*W6+IN2-1*W7+IN2-2*W8+IN2-3*W9. In order to write the weights W1 to W9 to the bit line BL2, the weight W1 is written into a memory cell at intersection of the bit line BL2 and the word line WL4; the weight W2 is written into a memory cell at intersection of the bit line BL2 and the word line WL5; the weight W3 is written into a memory cell at intersection of the bit line BL2 and the word line WL6; the weight W4 is written into a memory cell at intersection of the bit line BL2 and the word line WL7; the weight W5 is written into a memory cell at intersection of the bit line BL2 and the word line WL8; the weight W6 is written into a memory cell at intersection of the bit line BL2 and the word line WL9; the weight W7 is written into a memory cell at intersection of the bit line BL2 and the word line WL10; the weight W8 is written into a memory cell at intersection of the bit line BL2 and the word line WL11; and the weight W9 is written into a memory cell at intersection of the bit line BL2 and the word line WL12. When the input data IN1-4 to IN1-9 and IN2-1 to IN2-3 are input into the word lines WL4 to WL12, respectively (in the case that the word lines WL4 to WL12 are selected), the latch unit L2 (which is related to the bit line BL2) stores the value of: IN1-4*W1+IN1-5*W2+IN1-6*W3+IN1-7*W4+IN1-8*W5+IN1-9*W6+IN2-1*W7+IN2-2*W8+IN2-3*W9.

As shown in operation (c) of FIG. 7A, the input data IN1-7 to IN1-9 and IN2-1 to IN2-6 are multiplied by the weights W1 to W9 and thus the following is obtained: IN1-7*W1+IN1-8*W2+IN1-9*W3+IN2-1*W4+IN2-2*W5+IN2-3*W6+IN2-4*W7+IN2-5*W8+IN2-6*W9. In order to write the weights W1 to W9 to the bit line BL3, the weight W1 is written into a memory cell at intersection of the bit line BL3 and the word line WL7; the weight W2 is written into a memory cell at intersection of the bit line BL3 and the word line WL8; the weight W3 is written into a memory cell at intersection of the bit line BL3 and the word line WL9; the weight W4 is written into a memory cell at intersection of the bit line BL3 and the word line WL10; the weight W5 is written into a memory cell at intersection of the bit line BL3 and the word line WL11; the weight W6 is written into a memory cell at intersection of the bit line BL3 and the word line WL12; the weight W7 is written into a memory cell at intersection of the bit line BL3 and the word line WL13; the weight W8 is written into a memory cell at intersection of the bit line BL3 and the word line WL14; and the weight W9 is written into a memory cell at intersection of the bit line BL3 and the word line WL15. When the input data IN1-7 to IN1-9 and IN2-1 to IN2-6 are input into the word lines WL7 to WL15, respectively, the latch unit L3 (which is related to the bit line BL3) stores the value of: IN1-7*W1+IN1-8*W2+IN1-9*W3+IN2-1*W4+IN2-2*W5+IN2-3*W6+IN2-4*W7+IN2-5*W8+IN2-6*W9.

As shown in operation (d) of FIG. 7A, the input data IN2-1 to IN2-9 are multiplied by the weights W1 to W9 and thus the following is obtained: IN2-1*W1+IN2-2*W2+IN2-3*W3+IN2-4*W4+IN2-5*W5+IN2-6*W6+IN2-7*W7+IN2-8*W8+IN2-9*W9. In order to write the weights W1 to W9 to the bit line BL4, the weight W1 is written into a memory cell at intersection of the bit line BL4 and the word line WL10; the weight W2 is written into a memory cell at intersection of the bit line BL4 and the word line WL11; the weight W3 is written into a memory cell at intersection of the bit line BL4 and the word line WL12; the weight W4 is written into a memory cell at intersection of the bit line BL4 and the word line WL13; the weight W5 is written into a memory cell at intersection of the bit line BL4 and the word line WL14; the weight W6 is written into a memory cell at intersection of the bit line BL4 and the word line WL15; the weight W7 is written into a memory cell at intersection of the bit line BL4 and the word line WL16; the weight W8 is written into a memory cell at intersection of the bit line BL4 and the word line WL17; and the weight W9 is written into a memory cell at intersection of the bit line BL4 and the word line WL18. When the input data IN2-1 to IN2-9 are input into the word lines WL10 to WL18, respectively, the latch unit L4 (which is related to the bit line BL4) stores the value of: IN2-1*W1+IN2-2*W2+IN2-3*W3+IN2-4*W4+IN2-5*W5+IN2-6*W6+IN2-7*W7+IN2-8*W8+IN2-9*W9.

As shown in operation (e) of FIG. 7A, the input data IN1-2, IN1-3, IN3-1, IN1-5, IN1-6, IN3-4, IN1-8, IN1-9 and IN3-7 are multiplied by the weights W1 to W9 and thus the following is obtained: IN1-2*W1+IN1-3*W2+IN3-1*W3+IN1-5*W4+IN1-6*W5+IN3-4*W6+IN1-8*W7+IN1-9*W8+IN3-7*W9. In order to write the weights W1 to W9 to the bit line BL5, the weight W1 is written into a memory cell at intersection of the bit line BL5 and the word line WL2; the weight W2 is written into a memory cell at intersection of the bit line BL5 and the word line WL3; the weight W3 is written into a memory cell at intersection of the bit line BL5 and the word line WL19; the weight W4 is written into a memory cell at intersection of the bit line BL5 and the word line WL5; the weight W5 is written into a memory cell at intersection of the bit line BL5 and the word line WL6; the weight W6 is written into a memory cell at intersection of the bit line BL5 and the word line WL22; the weight W7 is written into a memory cell at intersection of the bit line BL5 and the word line WL8; the weight W8 is written into a memory cell at intersection of the bit line BL5 and the word line WL9; and the weight W9 is written into a memory cell at intersection of the bit line BL5 and the word line WL25. When the input data IN1-2, IN1-3, IN3-1, IN1-5, IN1-6, IN3-4, IN1-8, IN1-9 and IN3-7 are input, the latch unit L5 (which is related to the bit line BL5) stores the value of: IN1-2*W1+IN1-3*W2+IN3-1*W3+IN1-5*W4+IN1-6*W5+IN3-4*W6+IN1-8*W7+IN1-9*W8+IN3-7*W9.

Figure 7B:
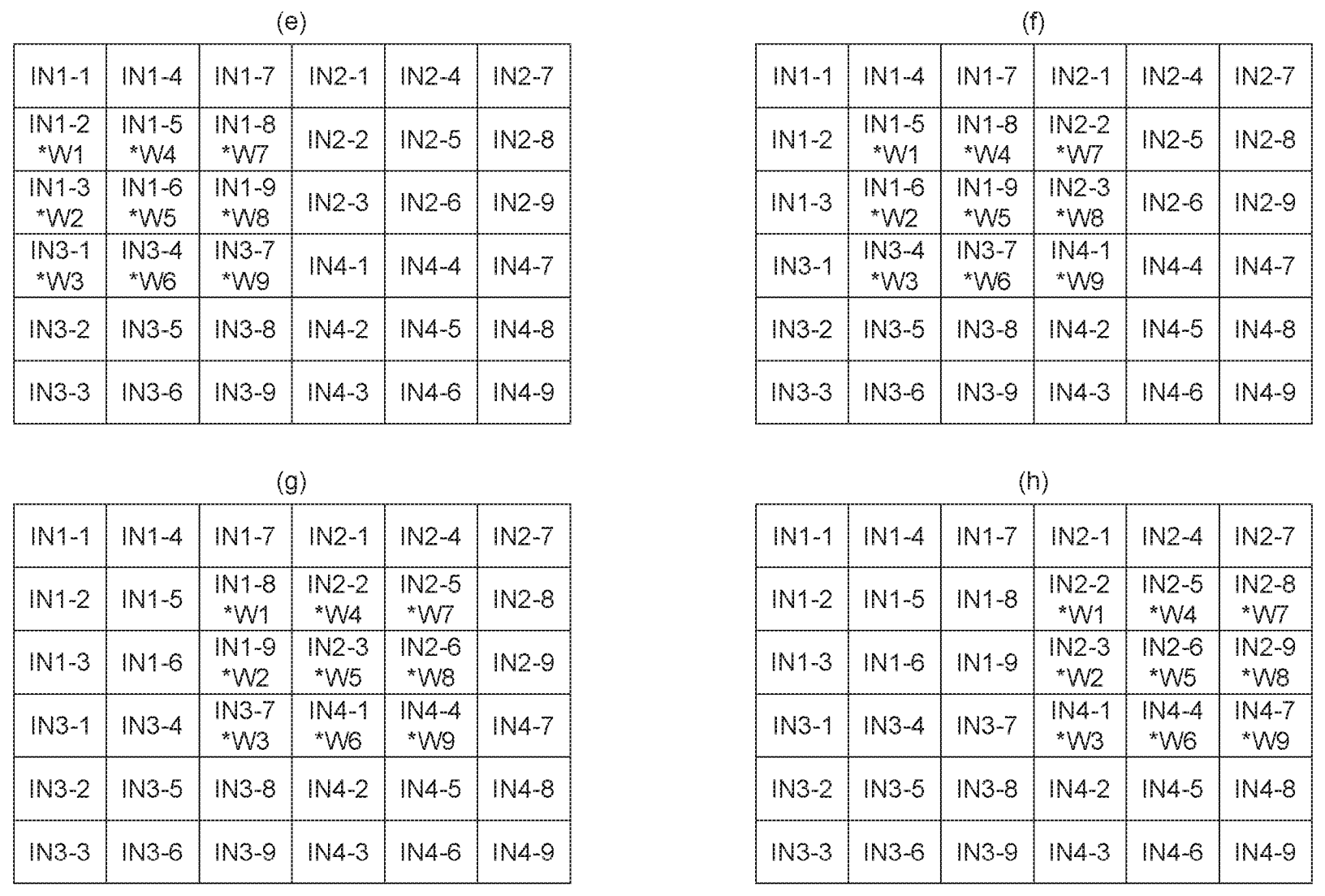

As shown in operation (f) of FIG. 7B, the input data IN1-5, IN1-6, IN3-4, IN1-8, IN1-9, IN3-7, IN2-2, IN2-3 and IN4-1 are multiplied by the weights W1 to W9 and thus the following is obtained: IN1-5*W1+IN1-6*W2+IN3-4*W3+IN1-8*W4+IN1-9*W5+IN3-7*W6+IN2-2*W7+IN2-3*W8+IN4-1*W9. In order to write the weights W1 to W9 into the bit line BL6, the weight W1 is written into a memory cell at intersection of the bit line BL6 and the word line WL5; the weight W2 is written into a memory cell at intersection of the bit line BL6 and the word line WL6; the weight W3 is written into a memory cell at intersection of the bit line BL6 and the word line WL22; the weight W4 is written into a memory cell at intersection of the bit line BL6 and the word line WL8; the weight W5 is written into a memory cell at intersection of the bit line BL6 and the word line WL9; the weight W6 is written into a memory cell at intersection of the bit line BL6 and the word line WL25; the weight W7 is written into a memory cell at intersection of the bit line BL6 and the word line WL11; the weight W8 is written into a memory cell at intersection of the bit line BL6 and the word line WL12; and the weight W9 is written into a memory cell at intersection of the bit line BL6 and the word line WL28. When the input data IN1-5, IN1-6, IN3-4, IN1-8, IN1-9, IN3-7, IN2-2, IN2-3 and IN4-1 are input, the latch unit L6 (which is related to the bit line BL6) stores the value of: IN1-5*W1+IN1-6*W2+IN3-4*W3+IN1-8*W4+IN1-9*W5+IN3-7*W6+IN2-2*W7+IN2-3*W8+IN4-1*W9.

As shown in operation (g) of FIG. 7B, the input data IN1-8, IN1-9, IN3-7, IN2-2, IN2-3, IN4-1, IN2-5, IN2-6 and IN4-4 are multiplied by the weights W1 to W9 and thus the following is obtained: IN1-8*W1+IN1-9*W2+IN3-7*W3+IN2-2*W4+IN2-3*W5+IN4-1*W6+IN2-5*W7+IN2-6*W8+IN4-4*W9. In order to write the weights W1 to W9 into the bit line BL7, the weight W1 is written into a memory cell at intersection of the bit line BL7 and the word line WL8; the weight W2 is written into a memory cell at intersection of the bit line BL7 and the word line WL9; the weight W3 is written into a memory cell at intersection of the bit line BL7 and the word line WL25; the weight W4 is written into a memory cell at intersection of the bit line BL7 and the word line WL11; the weight W5 is written into a memory cell at intersection of the bit line BL7 and the word line WL12: the weight W6 is written into a memory cell at intersection of the bit line BL7 and the word line WL28; the weight W7 is written into a memory cell at intersection of the bit line BL7 and the word line WL14; the weight W8 is written into a memory cell at intersection of the bit line BL7 and the word line WL15; and the weight W9 is written into a memory cell at intersection of the bit line BL7 and the word line WL31. When the input data IN1-8, IN1-9, IN3-7, IN2-2, IN2-3, IN4-1, IN2-5, IN2-6 and IN4-4 are input, the latch unit L7 (which is related to the bit line BL7) stores the value of: IN1-8*W1+IN1-9*W2+IN3-7*W3+IN2-2*W4+IN2-3*W5+IN4-1*W6+IN2-5*W7+IN2-6*W8+IN4-4*W9.

As shown in operation (h) of FIG. 7B, the input data IN2-2, IN2-3, IN4-1, IN2-5, IN2-6, IN4-4, IN2-8, IN2-9 and IN4-1 are multiplied by the weights W1 to W9 and thus the following is obtained: IN2-2*W1+IN2-3*W2+IN4-1*W3+IN2-5*W4+IN2-6*W5+IN4-4*W6+IN2-8*W7+IN2-9*W8+IN4-7*W9. In order to write the weights W1 to W9 into the bit line BL8, the weight W1 is written into a memory cell at intersection of the bit line BL8 and the word line WL11; the weight W2 is written into a memory cell at intersection of the bit line BL8 and the word line WL12; the weight W3 is written into a memory cell at intersection of the bit line BL8 and the word line WL28; the weight W4 is written into a memory cell at intersection of the bit line BL8 and the word line WL14; the weight W5 is written into a memory cell at intersection of the bit line BL8 and the word line WL15; the weight W6 is written into a memory cell at intersection of the bit line BL8 and the word line WL31; the weight W7 is written into a memory cell at intersection of the bit line BL8 and the word line WL17; the weight W8 is written into a memory cell at intersection of the bit line BL8 and the word line WL18; and the weight W9 is written into a memory cell at intersection of the bit line BL8 and the word line WL34. When the input data IN2-2, IN2-3, IN4-1, IN2-5, IN2-6, IN4-4, IN2-8, IN2-9 and IN4-1 are input, the latch unit L8 (which is related to the bit line BL8) stores the value of: IN2-2*W1+IN2-3*W2+IN4-1*W3+IN2-5*W4+IN2-6*W5+IN4-4*W6+IN2-8*W7+IN2-9*W8+IN4-7*W9.

Figure 7C:
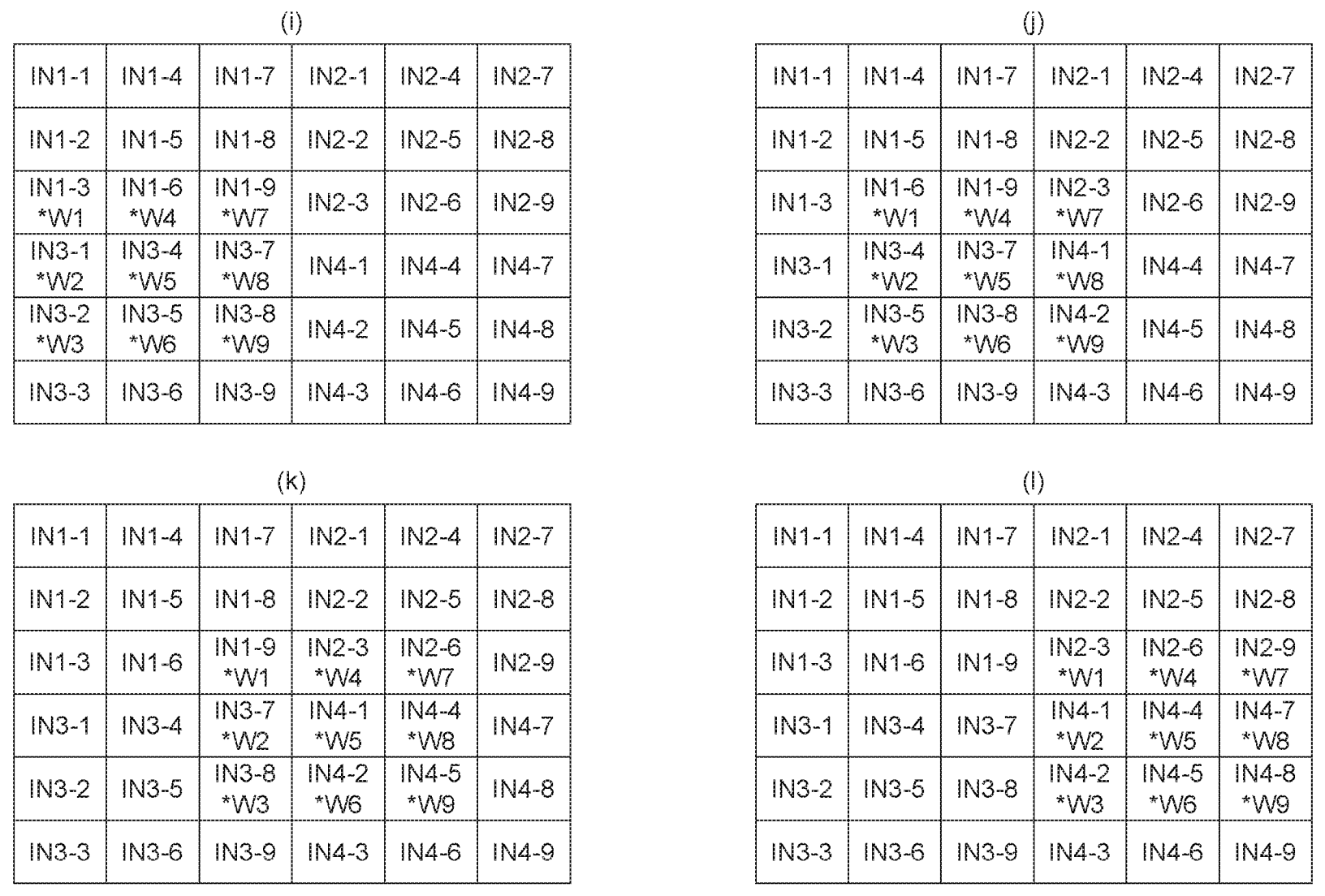

As shown in operation (i) of FIG. 7C, the input data IN1-3, IN3-1, IN3-2, IN1-6, IN3-4, IN3-5, IN1-9, IN3-7 and IN3-8 are multiplied by the weights W1 to W9 and thus the following is obtained: IN1-3*W1+IN3-1*W2+IN3-2*W3+IN1-6*W4+IN3-4*W5+IN3-5*W6+IN1-9*W7+IN3-7*W8+IN3-8*W9. In order to write the weights W1 to W9 into the bit line BL9, the weight W1 is written into a memory cell at intersection of the bit line BL9 and the word line WL3; the weight W2 is written into a memory cell at intersection of the bit line BL9 and the word line WL19; the weight W3 is written into a memory cell at intersection of the bit line BL9 and the word line WL20; the weight W4 is written into a memory cell at intersection of the bit line BL9 and the word line WL6; the weight W5 is written into a memory cell at intersection of the bit line BL9 and the word line WL22; the weight W6 is written into a memory cell at intersection of the bit line BL9 and the word line WL23; the weight W7 is written into a memory cell at intersection of the bit line BL9 and the word line WL9; the weight W8 is written into a memory cell at intersection of the bit line BL9 and the word line WL25; and the weight W9 is written into a memory cell at intersection of the bit line BL9 and the word line WL26. When the input data IN1-3, IN3-1, IN3-2, IN1-6, IN3-4, IN3-5, IN1-9, IN3-7 and IN3-8 are input, the latch unit L9 (which is related to the bit line BL9) stores the value of: IN1-3*W1+IN3-1*W2+IN3-2*W3+IN1-6*W4+IN3-4*W5+IN3-5*W6+IN1-9*W7+IN3-7*W8+IN3-8*W9.

As shown in operation (j) of FIG. 7C, the input data IN1-6, IN3-4, IN3-5, IN1-9, IN3-7, IN3-8, IN2-3, IN4-1 and IN4-2 are multiplied by the weights W1 to W9 and thus the following is obtained: IN1-6*W1+IN3-4*W2+IN3-5*W3+IN1-9*W4+IN3-7*W5+IN3-8*W6+IN2-3*W7+IN4-1*W8+N4-2*W9. In order to write the weights W1 to W9 into the bit line BL10, the weight W1 is written into a memory cell at intersection of the bit line BL10 and the word line WL6; the weight W2 is written into a memory cell at intersection of the bit line BL10 and the word line WL22; the weight W3 is written into a memory cell at intersection of the bit line BL10 and the word line WL23; the weight W4 is written into a memory cell at intersection of the bit line BL10 and the word line WL9; the weight W5 is written into a memory cell at intersection of the bit line BL10 and the word line WL25; the weight W6 is written into a memory cell at intersection of the bit line BL10 and the word line WL26; the weight W7 is written into a memory cell at intersection of the bit line BL10 and the word line WL12; the weight W8 is written into a memory cell at intersection of the bit line BL10 and the word line WL28; and the weight W9 is written into a memory cell at intersection of the bit line BL10 and the word line WL29. When the input data IN1-6, IN3-4, IN3-5, IN1-9, IN3-7, IN3-8, IN2-3, IN4-1 and IN4-2 are input, the latch unit L10 (which is related to the bit line BL10) stores the value of: IN1-6*W1+IN3-4*W2+IN3-5*W3+IN1-9*W4+IN3-7*W5+IN3-8*W6+IN2-3*W7+IN4-1*W8+IN4-2*W9.

As shown in operation (k) of FIG. 7C, the input data IN1-9, IN3-7, IN3-8, IN2-3, IN4-1, IN4-2, IN2-6, IN4-4 and IN4-5 are multiplied by the weights W1 to W9 and thus the following is obtained: IN1-9*W1+IN3-7*W2+IN3-8*W3+IN2-3*W4+IN4-1*W5+IN4-2*W6+IN2-3*W7+IN4-4*W8+IN4-5*W9. In order to write the weights W1 to W9 into the bit line BL11, the weight W1 is written into a memory cell at intersection of the bit line BL11 and the word line WL9; the weight W2 is written into a memory cell at intersection of the bit line BL11 and the word line WL25; the weight W3 is written into a memory cell at intersection of the bit line BL11 and the word line WL26; the weight W4 is written into a memory cell at intersection of the bit line BL11 and the word line WL12; the weight W5 is written into a memory cell at intersection of the bit line BL11 and the word line WL28; the weight W6 is written into a memory cell at intersection of the bit line BL11 and the word line WL29; the weight W7 is written into a memory cell at intersection of the bit line BL11 and the word line WL15: the weight W8 is written into a memory cell at intersection of the bit line BL11 and the word line WL31; and the weight W9 is written into a memory cell at intersection of the bit line BL11 and the word line WL32. When the input data IN1-9, IN3-7, IN3-8, IN2-3, IN4-1, IN4-2, IN2-6, IN4-4 and IN4-5 are input, the latch unit L11 (which is related to the bit line BL11) stores the value of: IN1-9*W1+IN3-7*W2+IN3-8*W3+IN2-3*W4+IN4-1*W5+IN4-2*W6+IN2-3*W7+IN4-4*W8+IN4-5*W9.

As shown in operation (1) of FIG. 7C, the input data IN2-3, IN4-1, IN4-2, IN2-6, IN4-4, IN4-5, IN2-9, IN4-7 and IN4-8 are multiplied by the weights W1 to W9 and thus the following is obtained: IN2-3*W1+IN4-1*W2+IN4-2*W3+IN2-6*W4+IN4-4*W5+IN4-5*W6+IN2-9*W7+IN4-7*W8+IN4-8*W9. In order to write the weights W1 to W9 into the bit line BL12, the weight W1 is written into a memory cell at intersection of the bit line BL12 and the word line WL12; the weight W2 is written into a memory cell at intersection of the bit line BL12 and the word line WL28; the weight W3 is written into a memory cell at intersection of the bit line BL12 and the word line WL29; the weight W4 is written into a memory cell at intersection of the bit line BL12 and the word line WL15; the weight W5 is written into a memory cell at intersection of the bit line BL12 and the word line WL31; the weight W6 is written into a memory cell at intersection of the bit line BL12 and the word line WL32; the weight W7 is written into a memory cell at intersection of the bit line BL12 and the word line WL18; the weight W8 is written into a memory cell at intersection of the bit line BL12 and the word line WL34; and the weight W9 is written into a memory cell at intersection of the bit line BL12 and the word line WL35. When the input data IN2-3, IN4-1, IN4-2, IN2-6, IN4-4, IN4-5, IN2-9, IN4-7 and IN4-8 are input, the latch unit L12 (which is related to the bit line BL12) stores the value of: IN2-3*W1+IN4-1*W2+IN4-2*W3+IN2-6*W4+IN4-4*W5+IN4-5*W6+IN2-9*W7+IN4-7*W8+IN4-8*W9.

Figure 7D:
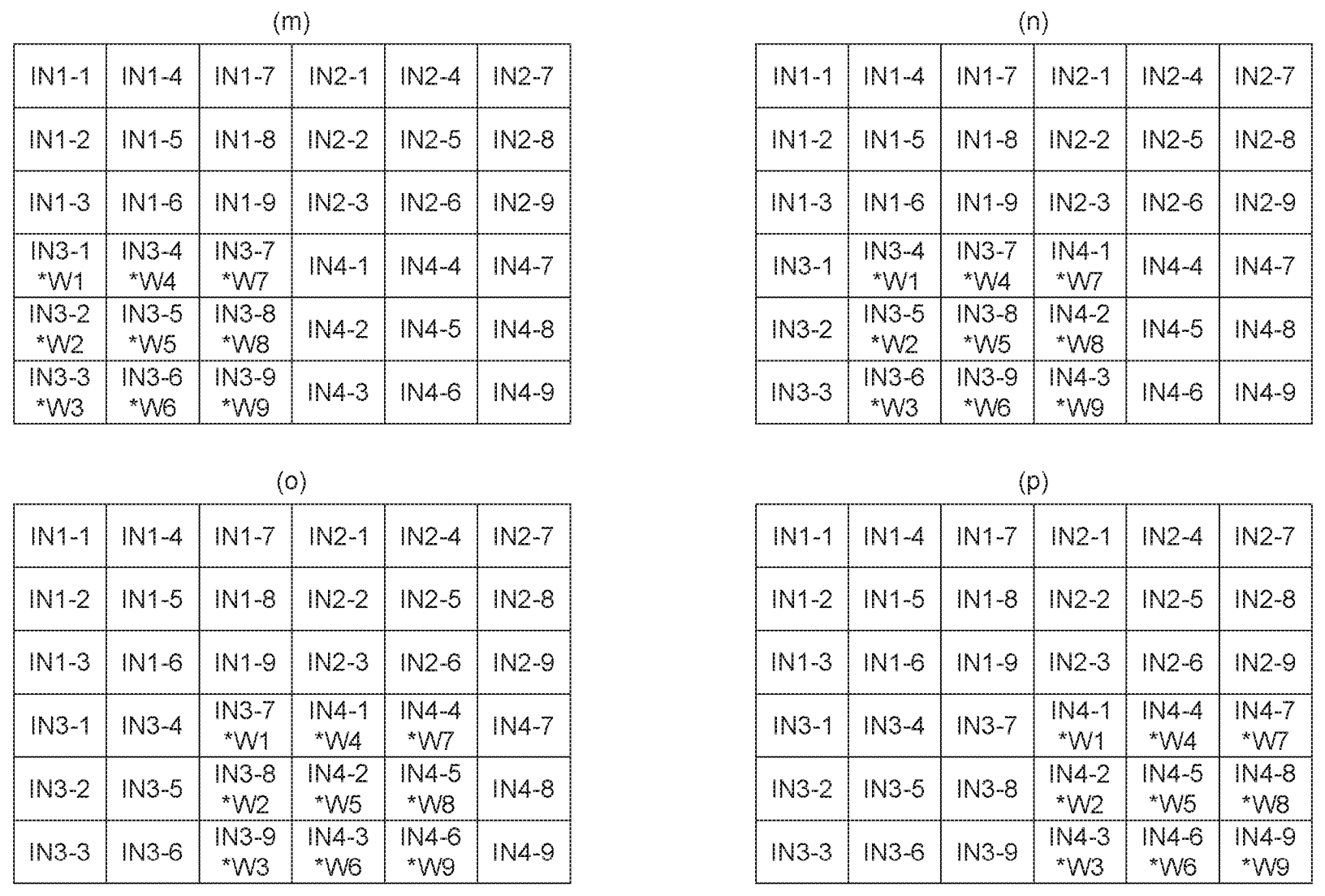

As shown in operation (m) of FIG. 7D, the input data IN3-1 to IN3-9 are multiplied by the weights W1 to W9 and thus the following is obtained: IN3-1*W1+IN3-2*W2+IN3-3*W3+IN3-4*W4+IN3-5*W5+IN3-6*W6+IN3-7*W7+IN3-8*W8+IN3-9*W9. In order to write the weights W1 to W9 into the bit line BL13, the weight W1 is written into a memory cell at intersection of the bit line BL13 and the word line WL19; the weight W2 is written into a memory cell at intersection of the bit line BL13 and the word line WL20; the weight W3 is written into a memory cell at intersection of the bit line BL13 and the word line WL21; the weight W4 is written into a memory cell at intersection of the bit line BL13 and the word line WL22; the weight W5 is written into a memory cell at intersection of the bit line BL13 and the word line WL24; the weight W6 is written into a memory cell at intersection of the bit line BL13 and the word line WL24; the weight W7 is written into a memory cell at intersection of the bit line BL13 and the word line WL25; the weight W8 is written into a memory cell at intersection of the bit line BL13 and the word line WL26; and the weight W9 is written into a memory cell at intersection of the bit line BL13 and the word line WL27. When the input data IN3-1 to IN3-9 are input, the latch unit L13 (which is related to the bit line BL13) stores the value of: IN3-1*W1+IN3-2*W2+IN3-3*W3+IN3-4*W4+IN3-5*W5+IN3-6*W6+IN3-7*W7+IN3-8*W8+IN3-9*W9.

As shown in operation (n) of FIG. 7D, the input data IN3-4 to IN3-9 and IN4-1 to IN4-3 are multiplied by the weights W1 to W9 and thus the following is obtained: IN3-4*W1+IN3-5*W2+IN3-6*W3+IN3-7*W4+IN3-8*W5+IN3-9*W6+IN4-1*W7+IN4-2*W8+N4-3*W9. In order to write the weights W1 to W9 into the bit line BL14, the weight W1 is written into a memory cell at intersection of the bit line BL14 and the word line WL22; the weight W2 is written into a memory cell at intersection of the bit line BL14 and the word line WL23; the weight W3 is written into a memory cell at intersection of the bit line BL14 and the word line WL24; the weight W4 is written into a memory cell at intersection of the bit line BL14 and the word line WL25; the weight W5 is written into a memory cell at intersection of the bit line BL14 and the word line WL26; the weight W6 is written into a memory cell at intersection of the bit line BL14 and the word line WL27; the weight W7 is written into a memory cell at intersection of the bit line BL14 and the word line WL28; the weight W8 is written into a memory cell at intersection of the bit line BL14 and the word line WL29; and the weight W9 is written into a memory cell at intersection of the bit line BL14 and the word line WL30. When the input data IN3-4 to IN3-9 and IN4-1 to IN4-3 are input, the latch unit L14 (which is related to the bit line BL14) stores the value of: IN3-4*W1+IN3-5*W2+IN3-6*W3+IN3-7*W4+IN3-8*W5+IN3-9*W6+IN4-1*W7+IN4-2*W8+IN4-3*W9.

As shown in operation (o) of FIG. 7D, the input data IN3-7 to IN3-9 and IN4-1 to IN4-6 are multiplied by the weights W1 to W9 and thus the following is obtained: IN3-7*W1+IN3-8*W2+IN3-9*W3+IN4-1*W4+IN4-2*W5+IN4-3*W6+IN4-4*W7+IN4-5*W8+IN4-6*W9. In order to write the weights W1 to W9 into the bit line BL15, the weight W1 is written into a memory cell at intersection of the bit line BL15 and the word line WL28; the weight W2 is written into a memory cell at intersection of the bit line BL15 and the word line WL26; the weight W3 is written into a memory cell at intersection of the bit line BL15 and the word line WL27; the weight W4 is written into a memory cell at intersection of the bit line BL15 and the word line WL28; the weight W5 is written into a memory cell at intersection of the bit line BL15 and the word line WL29; the weight W6 is written into a memory cell at intersection of the bit line BL15 and the word line WL30: the weight W7 is written into a memory cell at intersection of the bit line BL15 and the word line WL32; the weight W8 is written into a memory cell at intersection of the bit line BL15 and the word line WL32; and the weight W9 is written into a memory cell at intersection of the bit line BL15 and the word line WL33. When the input data IN3-4 to IN3-9 and IN4-1 to IN4-3 are input, the latch unit L15 (which is related to the bit line BL15) stores the value of: IN3-4*W1+IN3-5*W2+IN3-6*W3+IN3-7*W4+IN3-8*W5+IN3-9*W6+IN4-1*W7+IN4-2*W8+IN4-3*W9.

As shown in operation (p) of FIG. 7D, the input data IN4-1 to IN4-9 are multiplied by the weights W1 to W9 and thus the following is obtained: IN4-1*W1+IN4-2*W2+IN4-3*W3+IN4-4*W4+IN4-5*W5+IN4-6*W6+IN4-7*W7+IN4-8*W8+IN4-9*W9. In order to write the weights W1 to W9 into the bit line BL16, the weight W1 is written into a memory cell at intersection of the bit line BL16 and the word line WL28; the weight W2 is written into a memory cell at intersection of the bit line BL16 and the word line WL29; the weight W3 is written into a memory cell at intersection of the bit line BL16 and the word line WL30; the weight W4 is written into a memory cell at intersection of the bit line BL16 and the word line WL31; the weight W5 is written into a memory cell at intersection of the bit line BL16 and the word line WL32; the weight W6 is written into a memory cell at intersection of the bit line BL16 and the word line WL33; the weight W7 is written into a memory cell at intersection of the bit line BL16 and the word line WL34; the weight W8 is written into a memory cell at intersection of the bit line BL16 and the word line WL35; and the weight W9 is written into a memory cell at intersection of the bit line BL16 and the word line WL36. When the input data IN4-1 to IN4-9 are input, the latch unit L16 (which is related to the bit line BL16) stores the value of: IN4-1*W1+IN4-2*W2+IN4-3*W3+IN4-4*W4+IN4-5*W5+IN4-6*W6+IN4-7*W7+IN4-8*W8+IN4-9*W9.

FIG. 9A to FIG. 9H shows four cycles used to complete MAC operations according to one embodiment of the application.

As shown in FIG. 9A and FIG. 9B, in the first cycle, the word lines WL1 to WL9 are selected and thus the input data IN1-1 to IN1-9 are input into the memory array. Therefore, in the first cycle, the respective partial sum stored in the latch units L1 to L16 are as follows:

| | First cycle |
|---|---|
| L1 | [(IN1-1*W1) + (IN1-2*W2) + (IN1-3*W3) + (IN1-4*W4) + (IN1-5*W5) + (IN1-6*W6) + (IN1-7*W7) + (IN1-8*W8) + (IN1-9*W9)] |
| L2 | [(IN1-4*W1) + (IN1-5*W2) + (IN1-6*W3) + (IN1-7*W4) + (IN1-8*W5) + (IN1-9*W6)] |
| L3 | [(IN1-7*W1) + (IN1-8*W2) + (IN1-9*W3)] |
| L4 | 0 |
| L5 | [(IN1-2*W1) + (IN1-3*W2) + (IN1-5*W4) + (IN1-6*W5) + (IN1-8*W7) + (IN1-9*W8)] |
| L6 | [(IN1-5*W1) + (IN1-6*W2) + (IN1-8*W4) + (IN1-9*W5)] |
| L7 | (IN1-8*W1) + (IN1-9*W2)] |
| L8 | 0 |
| L9 | [(IN1-3*W1) + (IN1-6*W4) + (IN1-9*W7)] |

| First cycle | |
|---|---|
| L10 | [(IN1-6*W1) + (IN1-9*W4)] |
| L11 | [(IN1-9*W1)] |
| L12 | 0 |
| L13 | 0 |
| L14 | 0 |
| L15 | 0 |
| L16 | 0 |

As shown in FIG. 9C and FIG. 9, in the second cycle, the word lines WL10 to WL1 are selected and thus the input data IN2-1 to IN2-9 are input into the memory array. Therefore, in the second cycle, the respective partial sum stored in the latch units L1 to L16 are as follows (for easy understanding, the partial sum in the respective cycles are respectively listed):

| First cycle and Second cycle | | |
|---|---|---|
| L1 | First cycle | [(IN1-1*W1) + (IN1-2*W2) + (IN1-3*W3) + (IN1-4*W4) + (IN1-5*W5) + (IN1-6*W6) + (IN1-7*W7) + (IN1-8*W8) + (IN1-9*W9)] |
| | Second cycle | 0 |
| L2 | First cycle | [(IN1-4*W1) + (IN1-5*W2) + (IN1-6*W3) + (IN1-7*W4) + (IN1-8*W5) + (IN1-9*W6)] |
| | Second cycle | [(IN2-1*W7) + (IN2-2*W8) + (IN2-3*W9)] |
| L3 | First cycle | [(IN1-7*W1) + (IN1-8*W2) + (IN1-9*W3)] |
| | Second cycle | [(IN2-1*W4) + (IN2-2*W5) + (IN2-3*W6) + (IN2-4*W7) + (IN2-5*W8) + (IN2-6*W9)] |
| L4 | First cycle | 0 |
| | Second cycle | [(IN2-1*W1) + (IN2-2*W2) + (IN2-3*W3) + (IN2-4*W4) + (IN2-5*W5) + (IN2-6*W6) + (IN2-7*W7) + (IN2-8*W8) + (IN2-9*W9)] |
| L5 | First cycle | [(IN1-2*W1) + (IN1-3*W2) + (IN1-5*W4) + (IN1-6*W5) + (IN1-8*W7) + (IN1-9*W8)] |
| | Second cycle | 0 |
| L6 | First cycle | [(IN1-5*W1) + (IN1-6*W2) + (IN1-8*W4) + (IN1-9*W5)] |
| | Second cycle | [(IN2-2*W7) + (IN2-3*W8)] |
| L7 | First cycle | [(IN1-8*W1) + (IN1-9*W2)] |
| | Second cycle | [(IN2-2*W4) + (IN2-3*W5) + (IN2-5*W7) + (IN2-6*W8)] |
| L8 | First cycle | 0 |
| | Second cycle | [(IN2-2*W1) + (IN2-3*W2) + (IN2-5*W4) + (IN2-6*W5 + (IN2-8*W7) + (IN2-9*W8)] |
| L9 | First cycle | [(IN1-3*W1) + (IN1-6*W4) + (IN1-9*W7)] |
| | Second cycle | 0 |
| L10 | First cycle | [(IN1-6*W1) + (IN1-9*W4)] |
| | Second cycle | [(IN2-3*W7)] |
| L11 | First cycle | [(IN1-9*W1)] |
| | Second cycle | [(IN2-3*W4) + (IN2-6*W7)] |
| L12 | First cycle | 0 |
| | Second cycle | [(IN2-3*W1) + (IN2-6*W4) + (IN2-9*W7)] |
| L13 | First cycle | 0 |
| | Second cycle | 0 |
| L14 | First cycle | 0 |
| | Second cycle | 0 |
| L15 | First cycle | 0 |
| | Second cycle | 0 |
| L16 | First cycle | 0 |
| | Second cycle | 0 |

As shown in FIG. 9E and FIG. 9F, in the third cycle, the word lines WL9 to WL27 are selected and thus the input data I3-1 to IN3-9 are input into the memory array. Therefore, in the third cycle, the respective partial sum stored in the latch units L1 to L16 are as follows (for easy understanding, the partial sum in the respective cycles are respectively listed):

| First cycle to Third cycle | | |
|---|---|---|
| L1 | First cycle | [(IN1-1*W1) + (IN1-2*W2) + (IN1-3*W3) + (IN1-4*W4) + (IN1-5*W5) + (IN1-6*W6) + (IN1-7*W7) + (IN1-8*W8) + (IN1-9*W9)] |
| | Second cycle | 0 |
| | Third cycle | 0 |
| L2 | First cycle | [(IN1-4*W1) + (IN1-5*W2) + (IN1-6*W3) + (IN1-7*W4) + (IN1-8*W5) + (IN1-9*W6)] |
| | Second cycle | [(IN2-1*W7) + (IN2-2*W8) + (IN2-3*W9)] |
| | Third cycle | 0 |
| L3 | First cycle | [(IN1-7*W1) + (IN1-8*W2) + (IN1-9*W3)] |
| | Second cycle | [(IN2-1*W4) + (IN2-2*W5) + (IN2-3*W6) + (IN2-4*W7) + (IN2-5*W8) + (IN2-6*W9)] |
| | Third cycle | 0 |
| L4 | First cycle | 0 |
| | Second cycle | [(IN2-1*W1) + (IN2-2*W2) + (IN2-3*W3) + (IN2-4*W4) + (IN2-5*W5) + (IN2-6*W6) + (IN2-7*W7) + (IN2-8*W8) + (IN2-9*W9)] |
| | Third cycle | 0 |
| L5 | First cycle | [(IN1-2*W1) + (IN1-3*W2) + (IN1-5*W4) + (IN1-6*W5) + (IN1-8*W7) + (IN1-9*W8)] |
| | Second cycle | 0 |
| | Third cycle | [(IN3-1*W3) + (IN3-4*W6) + (IN3-7*W9)] |
| L6 | First cycle | [(IN1-5*W1) + (IN1-6*W2) + (IN1-8*W4) + (IN1-9*W5)] |
| | Second cycle | [(IN2-2*W7) + (IN2-3*W8)] |
| | Third cycle | [(IN3-4*W3) + (IN3-7*W6)] |
| L7 | First cycle | [(IN1-8*W1) + (IN1-9*W2)] |
| | Second cycle | [(IN2-2*W4) + (IN2-3*W5) + (IN2-5*W7) + (IN2-6*W8)] |
| | Third cycle | [(IN3-7*W3)] |

| | First cycle to Third cycle | |
|---|---|---|
| L8 | First cycle | 0 |
| | Second cycle | [(IN2-2*W1) + (IN2-3*W2) + (IN2-5*W4) + (IN2-6*W5) + (IN2-8*W7) + (IN2-9*W8)] |
| | Third cycle | 0 |
| L9 | First cycle | [(IN1-3*W1) + (IN1-6*W4) + (IN1-9*W7)] |
| | Second cycle | 0 |
| | Third cycle | [(IN3-1*W2) + (IN3-2*W3) + (IN3-4*W5) + (IN3-5*W6) + (IN3-7*W8) + (IN3-8*W9)] |
| L10 | First cycle | [(IN1-6*W1) + (IN1-9*W4)] |
| | Second cycle | [(IN2-3*W7)] |
| | Third cycle | [(IN3-4*W2) + (IN3-5*W3) + (IN3-7*W5) + (IN3-8*W6)] |
| L11 | First cycle | [(IN1-9*W1)] |
| | Second cycle | [(IN2-3*W4) + (IN2-6*W7)] |
| | Third cycle | [(IN3-7*W2) + (IN3-8*W3)] |
| L12 | First cycle | 0 |
| | Second cycle | [(IN2-3*W1) + (IN2-6*W4) + (IN2-9*W7)] |
| | Third cycle | 0 |
| L13 | First cycle | 0 |
| | Second cycle | 0 |
| | Third cycle | [(IN3-1*W1) + (IN3-2*W2) + (IN3-3*W3) + (IN3-4*W4) + (IN3-5*W5) + (IN3-6*W6) + (IN3-7*W7) + (IN3-8*W8) + (IN3-9*W9)] |
| L14 | First cycle | 0 |
| | Second cycle | 0 |
| | Third cycle | [(IN3-4*W1) + (IN3-5*W2) + (IN3-6*W3) + (IN3-7*W4) + (IN3-8*W5) + (IN3-9*W6)] |
| L15 | First cycle | 0 |
| | Second cycle | 0 |
| | Third cycle | [(IN3-7*W1) + (IN3-8*W2) + (IN3-9*W3)] |
| L16 | First cycle | 0 |
| | Second cycle | 0 |
| | Third cycle | 0 |

As shown in FIG. 9G and FIG. 9H, in the fourth cycle, the word lines WL28 to WL36 are selected and thus the input data IN4-1 to IN4-9 are input into the memory array. Therefore, in the fourth cycle, the respective partial sum stored in the latch units L1 to L16 are as follows (for easy understanding, the partial sum in the respective cycles are respectively listed):

| | First cycle to Fourth cycle | |
|---|---|---|
| L1 | First cycle | [(IN1-1*W1) + (IN1-2*W2) + (IN1-3*W3) + (IN1-4*W4) + (IN1-5*W5) + (IN1-6*W6) + (IN1-7*W7) + (IN1-8*W8) + (IN1-9*W9)] |
| | Second cycle | 0 |
| | Third cycle | 0 |
| | Fourth cycle | 0 |
| L2 | First cycle | [(IN1-4*W1) + (IN1-5*W2) + (IN1-6*W3) + (IN1-7*W4) + (IN1-8*W5) + (IN1-9*W6)] |
| | Second cycle | [(IN2-1*W7) + (IN2-2*W8) + (IN2-3*W9)] |
| | Third cycle | 0 |
| | Fourth cycle | 0 |
| L3 | First cycle | [(IN1-7*W1) + (IN1-8*W2) + (IN1-9*W3)] |
| | Second cycle | [(IN2-1*W4) + (IN2-2*W5) + (IN2-3*W6) + (IN2-4*W7) + (IN2-5*W8) + (IN2-6*W9)] |
| | Third cycle | 0 |
| | Fourth cycle | 0 |
| L4 | First cycle | 0 |
| | Second cycle | [(IN2-1*W1) + (IN2-2*W2) + (IN2-3*W3) + (IN2-4*W4) + (IN2-5*W5) + (IN2-6*W6) + (IN2-7*W7) + (IN2-8*W8) + (IN2-9*W9)] |
| | Third cycle | 0 |
| | Fourth cycle | 0 |
| L5 | First cycle | [(IN1-2*W1) + (IN1-3*W2) + (IN1-5*W4) + (IN1-6*W5) + (IN1-8*W7) + (IN1-9*W8)] |
| | Second cycle | 0 |
| | Third cycle | [(IN3-1*W3) + (IN3-4*W6) + (IN3-7*W9)] |
| | Fourth cycle | 0 |
| L6 | First cycle | [(IN1-5*W1) + (IN1-6*W2) + (IN1-8*W4) + (IN1-9*W5)] |
| | Second cycle | [(IN2-2*W7) + (IN2-3*W8)] |
| | Third cycle | [(IN3-4*W3) + (IN3-7*W6)] |
| | Fourth cycle | [(IN4-1*W9)] |
| L7 | First cycle | [(IN1-8*W1) + (IN1-9*W2)] |
| | Second cycle | [(IN2-2*W4) + (IN2-3*W5) + (IN2-5*W7) + (IN2-6*W8)] |
| | Third cycle | [(IN3-7*W3)] |
| | Fourth cycle | [(IN4-1*W6) + (IN4-4*W9)] |
| L8 | First cycle | 0 |
| | Second cycle | [(IN2-2*W1) + (IN2-3*W2) + (IN2-5*W4) + (IN2-6*W5) + (IN2-8*W7) + (IN2-9*W8)] |
| | Third cycle | 0 |
| | Fourth cycle | [(IN4-1*W3) + (IN4-4*W6) + (IN4-7*W9)] |
| L9 | First cycle | [(IN1-3*W1) + (IN1-6*W4) + (IN1-9*W7)] |
| | Second cycle | 0 |
| | Third cycle | [(IN 3-1*W2) + (IN3-2*W3) + (IN3-4*W5) + (IN3-5*W6) + (IN3-7*W8) + (IN3-8*W9)] |
| | Fourth cycle | 0 |
| L10 | First cycle | [(IN1-6*W1) + (IN1-9*W4)] |
| | Second cycle | [(IN2-3*W7)] |
| | Third cycle | [(IN3-4*W2) + (IN3-5*W3) + (IN3-7*W5) + (IN3-8*W6)] |
| | Fourth cycle | [(IN4-1*W8) + (IN4-2*W9)] |
| L11 | First cycle | [(IN1-9*W1)] |

| First cycle to Fourth cycle | | |
|---|---|---|
| | Second cycle | [(IN2-3*W4) + (IN2-6*W7)] |
| | Third cycle | [(IN3-7*W2) + (IN3-8*W3)] |
| | Fourth cycle | [(IN4-1*W5) + (IN4-2*W6) + (IN4-4*W8) + (IN4-5*W9)] |
| L12 | First cycle | 0 |
| | Second cycle | [(IN2-3*W1) + (IN2-6*W4) + (IN2-9*W7)] |
| | Third cycle | 0 |
| | Fourth cycle | [(IN4-1*W2) + (IN4-2*W3) + (IN4-4*W5) + (IN4-5*W6) + (IN4-7*W8) + (IN4-8*W9)] |
| L13 | First cycle | 0 |
| | Second cycle | 0 |
| | Third cycle | [(IN3-1*W1) + (IN3-2*W2) + (IN3-3*W3) + (IN3-4*W4) + (IN3-5*W5) + (IN3-6*W6) + (IN3-7*W7) + (IN3-8*W8) + (IN3-9*W9)] |
| | Fourth cycle | 0 |
| L14 | First cycle | 0 |
| | Second cycle | 0 |
| | Third cycle | [(IN3-4*W1) + (IN3-5*W2) + (IN3-6*W3) + (IN3-7*W4) + (IN3-8*W5) + (IN3-9*W6)] |
| | Fourth cycle | [(IN4-1*W7) + (IN4-2*W8) + (IN4-3*W9)] |
| L15 | First cycle | 0 |
| | Second cycle | 0 |
| | Third cycle | [(IN3-7*W1) + (IN3-8*W2) + (IN3-9*W3)] |
| | Fourth cycle | [(IN4-1*W4) + (IN4-2*W5) + (IN4-3*W6) + (IN4-4*W7) + (IN4-5*W8) + (IN4-6*W9)] |
| L16 | First cycle | 0 |
| | Second cycle | 0 |
| | Third cycle | 0 |
| | Fourth cycle | [(IN4-1*W1) + (IN4-2*W2) + (IN4-3*W3) + (IN4-4*W4) + (IN4-5*W5) + (IN4-6*W6) + (IN4-7*W7) + (IN4-8*W8) + (IN4-9*W9)] |

For easy understanding, the partial sums in the four cycles are added as follows (i.e. the output from the latch units L1 to L16 after four cycles):

| | |
|---|---|
| L1 | (IN1-1*W1) + (IN1-2*W2) + (IN1-3*W3) + (IN1-4*W4) + (IN1-5*W5) + (IN1-6*W6) + (IN1-7*W7) + (IN1-8*W8) + (IN1-9*W9) |
| L2 | (IN1-4*W1) + (IN1-5*W2) + (IN1-6*W3) + (IN1-7*W4) + (IN1-8*W5) + (IN1-9*W6) + (IN2-1*W7) + (IN2-2*W8) + (IN2-3*W9) |
| L3 | (IN1-7*W1) + (IN1-8*W2) + (IN1-9*W3) + (IN2-1*W4) + (IN2-2*W5) + (IN2-3*W6) + (IN2-4*W7) + (IN2-5*W8) + (IN2-6*W9) |
| L4 | (IN2-1*W1) + (IN2-2*W2) + (IN2-3*W3) + (IN2-4*W4) + (IN2-5*W5) + (IN2-6*W6) + (IN2-7*W7) + (IN2-8*W8) + (IN2-9*W9) |
| L5 | (IN1-2*W1) + (IN1-3*W2) + (IN1-5*W4) + (IN1-6*W5) + (IN1-8*W7) + (IN1-9*W8) + (IN3-1*W3) + (IN3-4*W6) + (IN3-7*W9) |
| L6 | (IN1-5*W1) + (IN1-6*W2) + (IN-8*W4) + (IN1-9*W5) + (IN2-2*W7) + (IN2-3*W8) + (IN3-4*W3) + (IN3-7*W6)] + (IN4-1 *W9) |
| L7 | (IN1-8*W1) + (IN1-9*W2) + (IN2-2*W4) + (IN2-3*W5) + (IN2-5*W7) + (IN2-6*W8) + (IN3-7*W3) + (IN4-1*W6) + (IN4-4*W9) |
| L8 | (IN2-2*W1) + (IN2-3*W2) + (IN2-5*W4) + (IN2-6*W5) + (IN2-8*W7) + (IN2-9*W8) + (IN4-1*W3) + (IN4-4*W6) + (IN4-7*W9) |
| L9 | (IN1-3*W1) + (IN1-6*W4) + (IN1-9*W7) + (IN3-1*W2) + (IN3-2*W3) + (IN3-4*W5) + (IN3-5*W6) + (IN3-7*W8) + (IN3-8*W9) |
| L10 | (IN1-6*W1) + (IN1-9*W4) + (IN2-3*W7) + (IN3-4*W2) + (IN3-5*W3) + (IN3-7*W5) + (IN3-8*W6) + (IN4-1*W8) + (IN4-2*W9) |
| L11 | (IN1-9*W1) + (IN2-3*W4) + (IN2-6*W7) + (IN3-7*W2) + (IN3-8*W3) + (IN4-1*W5) + (IN4-2*W6) + (IN4-4*W8) + (IN4-5*W9) |
| L12 | (IN2-3*W1) + (IN2-6*W4) + (IN2-9*W7) + (IN4-1*W2) + (IN4-2*W3) + (IN4-4*W5) + (IN4-5*W6) + (IN4-7*W8) + (IN4-8*W9) |
| L13 | (IN3-1*W1) + (IN3-2*W2) + (IN3-3*W3) + (IN3-4*W4) + (IN3-5*W5) + (IN3-6*W6) + (IN3-7*W7) + (IN3-8*W8) + (IN3-9*W9) |
| L14 | (IN3-4*W1) + (IN3-5*W2) + (IN3-6*W3) + (IN3-7*W4) + (IN3-8*W5) + (IN3-9*W6) + (IN4-1*W7) + (IN4-2*W8) + (IN4-3*W9) |
| L15 | (IN3-7*W1) + (IN3-8*W2) + (IN3-9*W3) + (IN4-1*W4) + (IN4-2*W5) + (IN4-3*W6) + (IN4-4*W7) + (IN4-5*W8) + (IN4-6*W9) |
| L16 | (IN4-1*W1) + (IN4-2*W2) + (IN4-3*W3) + (IN4-4*W4) + (IN4-5*W5) + (IN4-6*W6) + (IN4-7*W7) + (IN4-8*W8) + (IN4-9*W9) |

Figure 10:
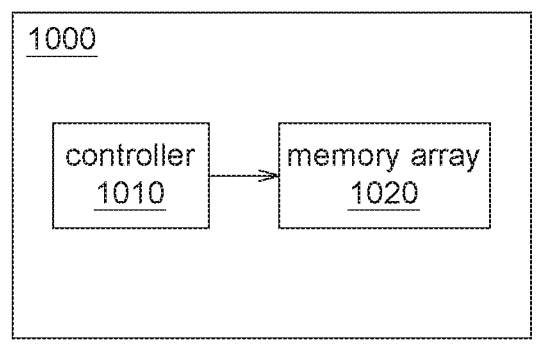
FIG. 10 shows a functional block diagram of the memory device according to one embodiment of the application.

FIG. 10 shows a functional block diagram of the memory device according to one embodiment of the application. The memory device 1000 according to one embodiment of the application includes a controller 1010 and a memory array 1020. The controller 1010 is coupled to the memory array 1020. The controller 1010 controls the memory array 1020 to perform the MAC operations in the above embodiments. A plurality of memory cells of the memory array 1020 store the weights in the above embodiments.

FIG. 11A and FIG. 11B show that a plurality of weights are written into a plurality of memory cells of the memory array 1100 according to one embodiment of the application. Compared with FIG. 8A and FIG. 8B, memory cell usage rate of the memory array 1100 of FIG. 11A and FIG. 11B is improved.

As above, advantages of embodiments of the application are reduction of data movement and faster execution time.

As above, in embodiments of the application, in stride operations, the kernel (the weight matrix) of the deep learning model are unfolded into a plurality of sub-kernels and a plurality of complement sub-kernels. The weights are written into the target memory cells based on the sub-kernels and the complement sub-kernels. Thus, the input data is efficiently reused in the memory array for reducing operation time and data movement.

Embodiments of the application are used in AI (Artificial Intelligence) field or any computing field having many MAC operations, for example but not limited by, memory data search, image processing and voice detection.

Embodiments of the application are used in different AI model design, for example but not limited by, fully connection layer model design, convolution layer model design, multilayer perceptron model design and support vector machine.

Embodiments of the application may apply any volatile memory (SRAM, DRAM) or any non-volatile memory (Resistive-RAM, Phase Change Memory, flash memory, Magnetoresistive RAM, Ferroelectric RAM and so on).

Further, in other possible embodiments of the application, the role of the bit lines and the word lines are interchangeable, that is, the input data may be input into the bit lines, which is still within the spirit and the scope of the application.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A computing in memory method for a memory device, the computing in memory method comprising:
   based on a stride parameter, unfolding a kernel into a plurality of sub-kernels and a plurality of complement sub-kernels;
   based on the sub-kernels and the complement sub-kernels, writing a plurality of weights into a plurality of target memory cells of a memory array of the memory device;
   inputting an input data into a selected word line of the memory array;
   performing a calculation operation in the memory array;
   temporarily storing a plurality of partial sums; and
   summing the stored partial sums into a result when all operation cycles are completed.

2. The computing in memory method according to claim 1, wherein the kernel includes an original weight matrix.

3. The computing in memory method according to claim 2, wherein in unfolding the kernel, based on the stride parameter, the kernel is stridden in a column direction and in a row direction to obtain the sub-kernels, wherein each of the sub-kernels is a weight matrix; the sub-kernels are a zero matrix or the sub-kernels includes at least one weight of the kernel.

4. The computing in memory method according to claim 2, wherein the sub-kernels are complemented as the complement sub-kernels, when the original weight matrix is k×l and the input data is N×M, for the stride parameter being equal to "1", a total number of the sub-kernels is (N−k+1)×(M−l+1) and a total number of the complement sub-kernels is (N−k+1)×(M−l+1).

5. The computing in memory method according to claim 1, wherein the partial sums are temporarily stored in at least one latch unit of the memory array.

6. A memory device comprising:
   a memory array; and
   a controller coupled to the memory array, the controller being configured for:
      based on a stride parameter, unfolding a kernel into a plurality of sub-kernels and a plurality of complement sub-kernels;
      based on the sub-kernels and the complement sub-kernels, writing a plurality of weights into a plurality of target memory cells of a memory array of the memory device;
      inputting an input data into a selected word line of the memory array;
      performing a calculation operation in the memory array;
      temporarily storing a plurality of partial sums; and
      summing the stored partial sums into a result when all operation cycles are completed.

7. The memory device according to claim 6, wherein the kernel includes an original weight matrix.

8. The memory device according to claim 7, wherein in unfolding the kernel, based on the stride parameter, the kernel is stridden in a column direction and in a row direction to obtain the sub-kernels, wherein each of the sub-kernels is a weight matrix; the sub-kernels are a zero matrix or the sub-kernels includes at least one weight of the kernel.

9. The memory device according to claim 7, wherein the sub-kernels are complemented as the complement sub-kernels, when the original weight matrix is k×l and the input data is N×M, for the stride parameter being equal to "1", a total number of the sub-kernels is (N−k+1)×(M−l+1) and a total number of the complement sub-kernels is (N−k+1)×(M−l+1).

10. The memory device according to claim 6, wherein the partial sums are temporarily stored in at least one latch unit of the memory array.

* * * * *